(12) United States Patent
Venkatakrishnan

(10) Patent No.: US 11,301,911 B2
(45) Date of Patent: Apr. 12, 2022

(54) PRODUCT OR SERVICE REQUESTS SYSTEM FOR MOBILE CUSTOMERS

(71) Applicant: Yellcast, Inc., Fremont, CA (US)

(72) Inventor: Ganesan Venkatakrishnan, Fremont, CA (US)

(73) Assignee: YELLCAST, INC., San Carlos, CA (US)

( * ) Notice: Subject to any disclaimer, the term of this patent is extended or adjusted under 35 U.S.C. 154(b) by 0 days.

(21) Appl. No.: 15/446,935

(22) Filed: Mar. 1, 2017

(65) Prior Publication Data

US 2017/0316480 A1 Nov. 2, 2017

Related U.S. Application Data

(63) Continuation of application No. 14/168,280, filed on Jan. 30, 2014, now abandoned, which is a continuation-in-part of application No. 13/986,790, filed on Mar. 16, 2013, now abandoned, which is a continuation-in-part of application No. 12/341,973, filed on Dec. 22, 2008, now Pat. No. 8,527,357.

(60) Provisional application No. 61/016,350, filed on Dec. 21, 2007.

(51) Int. Cl.
*G06Q 30/00* (2012.01)
*G06Q 30/06* (2012.01)

(52) U.S. Cl.
CPC ......... *G06Q 30/0611* (2013.01); *G06Q 30/06* (2013.01)

(58) Field of Classification Search
None
See application file for complete search history.

(56) References Cited

U.S. PATENT DOCUMENTS

| | | | |
|---|---|---|---|
| 7,139,732 B1 | 11/2006 | Desenberg | |
| 8,527,357 B1 | 9/2013 | Ganesan | |
| 2002/0023042 A1* | 2/2002 | Solomon | G06Q 30/0619 705/37 |
| 2002/0046147 A1 | 4/2002 | Livesay et al. | |
| 2002/0103743 A1* | 8/2002 | Najmi | G06F 9/542 705/37 |
| 2002/0116287 A1* | 8/2002 | Schubert | G06Q 30/06 705/26.61 |
| 2002/0178045 A1 | 11/2002 | Kraft et al. | |
| 2002/0188503 A1 | 12/2002 | Banerjee et al. | |
| 2003/0177277 A1 | 9/2003 | Dascalu | |
| 2004/0039681 A1 | 2/2004 | Cullen et al. | |

(Continued)

*Primary Examiner* — Mila Airapetian
(74) *Attorney, Agent, or Firm* — Philip H. Albert; Haynes and Boone LLP

(57) ABSTRACT

An on-line venue in which buyers can anonymously communicate precisely what product or service they want to purchase by posting an interactive request that a number of sellers/service providers can then directly respond to according to one embodiment of the invention. Such embodiments may promote the buyers interests in directly matching their needs with qualified vendors. In contrast to what others provide, where the buyer has to search within each seller/service providers and then send their request. Embodiments of the present invention broadcast a buyer's needs to relevant/selected sellers/service providers. Such embodiments may take the burden from a buyer in finding the right products and services by self-qualifying the lead to proactive prospective sellers/service providers.

14 Claims, 16 Drawing Sheets

(56) References Cited

U.S. PATENT DOCUMENTS

| | | |
|---|---|---|
| 2004/0177009 A1 | 9/2004 | Schrenk |
| 2004/0210513 A1 | 10/2004 | Harford et al. |
| 2005/0075945 A1* | 4/2005 | Hodge ................... G06Q 30/02 705/26.8 |
| 2005/0149410 A1 | 7/2005 | Livesay |
| 2006/0099964 A1 | 5/2006 | Barrese et al. |
| 2006/0111945 A1 | 5/2006 | Tinsley et al. |
| 2006/0184381 A1 | 8/2006 | Rice et al. |
| 2007/0250431 A1 | 10/2007 | Olof-Ors |
| 2011/0106640 A1 | 5/2011 | Lotvin et al. |
| 2012/0158475 A1 | 6/2012 | Mesaros |
| 2012/0209743 A1* | 8/2012 | Mesaros ................ G06Q 30/06 705/26.8 |
| 2014/0046792 A1 | 2/2014 | Ganesan |
| 2014/0180863 A1 | 6/2014 | Ganesan |
| 2014/0316927 A1 | 10/2014 | Ganesan |

\* cited by examiner

PRODUCT OR SERVICE REQUESTS SYSTEM FOR MOBILE CUSTOMERS

CROSS-REFERENCE TO RELATED APPLICATIONS

This application is a Continuation of U.S. patent application Ser. No. 14/168,280 filed Jan. 30, 2014, which is a Continuation-in-Part of U.S. patent application Ser. No. 13/986,790 filed Mar. 16, 2013, which is a Continuation-in-Part of U.S. patent application Ser. No. 12/341,973 filed Dec. 22, 2008, now U.S. Pat. No. 8,527,357, which claims the benefit of U.S. Provisional Patent Application No. 61/016,350, filed Dec. 21, 2007

Each of the above-cited applications is hereby incorporated by reference in their entirety, as if set forth in full in this document, for all purposes.

BACKGROUND OF THE INVENTION

The present invention relates in general to a buyer motivated online marketplace and, but not by way of limitation, to an online marketplace where buyers may communicate needed products and services among other things.

A typical system for connecting buyers and sellers might allow for sellers to post information, advertisements, etc. and allow buyers to search through the posted listing to find a seller. Once the buyer has selected one or more sellers to consider, the buyer then contacts those sellers, repeats to each of them the details of the buyer's request, possibly receives estimates or quotes from the contacted sellers and then the buyer selects one of the sellers and proceeds to a transaction.

This can be inefficient for buyers and sellers. For buyers, there might be considerable work corresponding with the sellers, getting information, and deciding on whom to transact with. For sellers, they might end up doing work in preparation for a transaction with a buyer where the seller later discovers that the seller is not interested in that particular transaction, for example where the seller knows it cannot provide the goods/services that particular buyer is asking for. In a typical approach, a seller would generate leads and/or pay for external lead generation, then follow up with each of the leads in an attempt to close a sale. This can be inefficient.

BRIEF SUMMARY OF THE INVENTION

An on-line brokering system allows buyers (i.e., purchasers or orderers of goods/services, etc.) to search for and select one or more sellers (i.e., sellers or providers of goods/services, etc.), generate a set of requirements for the transaction wherein the set of requirements varies among categories of transactions, and send that set of requirements to each of the selected sellers. At the seller's computer system (or telephone system), a seller can determine the buyer's requirements, determine whether the seller is interested in the lead, and respond accordingly. The sellers might be presented with leads anonymously with buyer information only provided after the seller agrees to pay a fee to get access to the lead based on the seller's review of the specified set of requirements.

In one embodiment, the present disclosure provides for an on-line brokering system in which buyers can anonymously communicate precisely what product or service they want to purchase by posting an interactive request that a number of sellers can then directly respond to. This embodiment may promote the buyers interests in directly matching their needs with qualified vendors.

Embodiments of the present invention broadcast a buyer's needs to selected/relevant sellers. Such embodiments may take the burden from a buyer in finding the right products and services by self-qualifying the lead to proactive prospective sellers.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The various embodiments are illustrated by way of example, and not by way of limitation, in the figures of the accompanying drawings as follows.

DETAILED DESCRIPTION OF THE INVENTION

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing a preferred exemplary embodiment. It being understood that various changes may be made in the function and arrangement of elements without departing from the spirit and scope as set forth in the appended claims.

In one embodiment, the present disclosure provides for a buyer motivated online market place according to one embodiment of the invention. A buyer may approach a website, for example, at the URL yellcast.<example>.com.

As used herein, "buyer" refers to a person, business entity, or organization that is interested in, or considering entering into a transaction to obtain goods, services, rights, access or some other benefit. As used herein, "seller" refers to a person, business entity, or organization that provides goods, services, rights, access or some other benefit to buyers, typically as part of a buyer-seller transaction wherein buyer provides some consideration (money, or other consideration) in exchange for what the seller provides to the buyer.

It should be understood from the descriptions herein, that "buyer" might refer to a person seeking to make a purchase, but might also, for brevity, refer to a computer, telephone device, or other electronic device that is used by the buyer to signal an interest in a transaction and/or to consummate that transaction. Likewise, "seller" might refer to a person or company that sells products and/or provides services, but also, for brevity, might refer to a computer, telephone device, or other electronic device that is used by the seller to obtain information about a lead and/or to consummate a transaction. Thus, a seller might be an individual, a merchant that trades in certain goods, or a person or company that provides a service, in which case, a service provider would be a "seller" as used herein, selling services (and providing them) to buyers.

Figure 4:
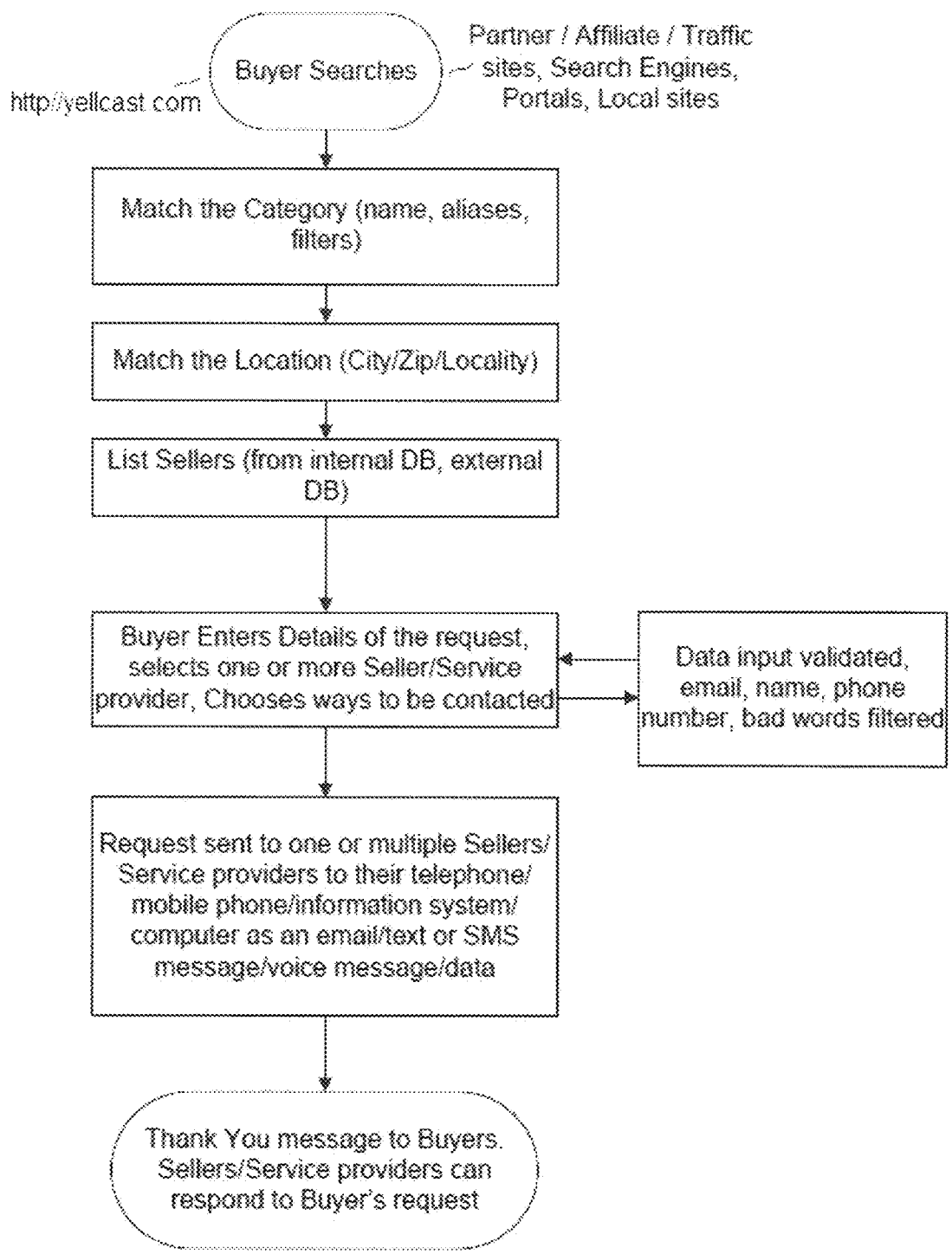
Figure 6:
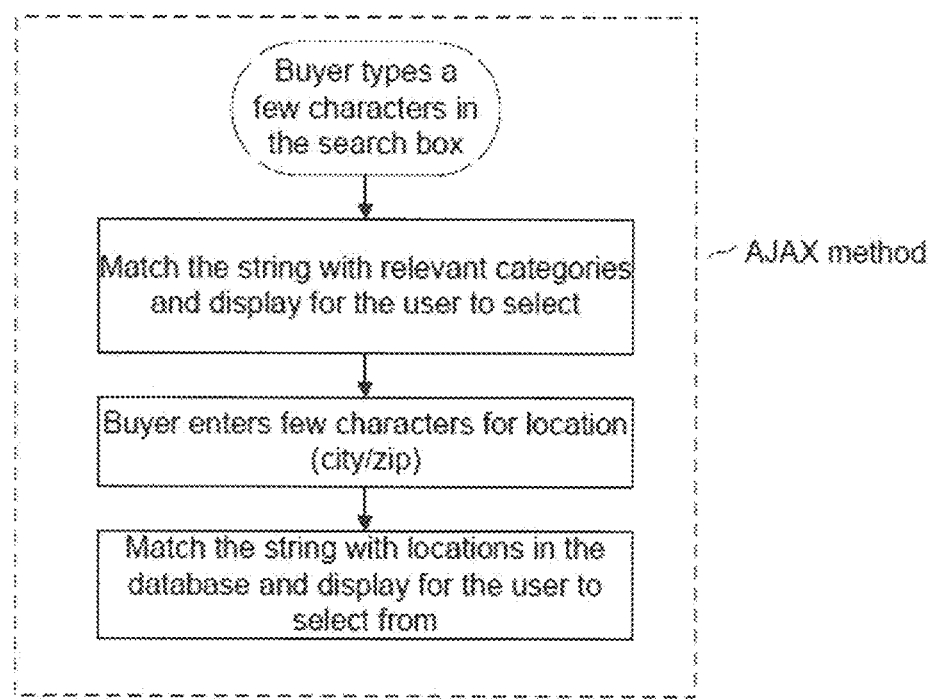

In one embodiment of a buyer motivated online market place, buyers interact with a web server that provides a web interface to buyers. At this website the buyer may be presented with a search box where they can type their desired product or service as illustrated in FIG. 4. Alternate ways of getting data using voice recognition software or search requests from external sites may also be used. As illustrated in FIG. 6 using Asynchronous JavaScript and XML (AJAX) technology, the website matches the categories and presents the user with a location where they desire the product or service. The website may also automatically identify the buyer's location to the closest city or state using IP address mapping or from the location information from a mobile device. The user can manually enter or override the default choice. Using AJAX, the service minimizes the need for typing the entire word and presents the cities and localities that match. The buyer can also enter a postal code or phone area code for location selection. The implementation however may not be limited to AJAX based.

Figure 2:
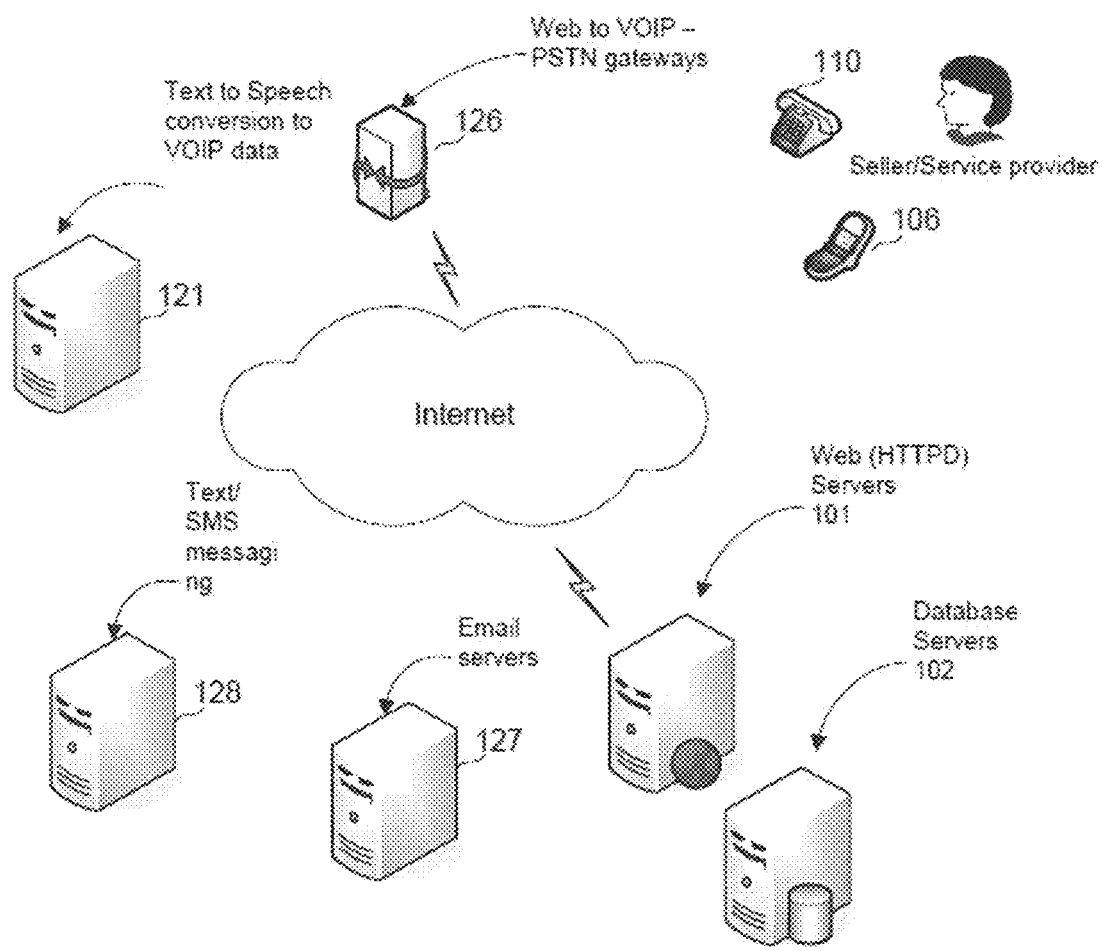

As seen in FIG. 4, once the location is determined, a form that details information may be presented to the buyer. The request form allows the buyer to enter specific product or service features, parameters, options, terms, notes and various other information. The user can also specify the length of time in which they wish to post their request and how and by when they would like to be notified. For example, FIG. 2 shows that notifications to sellers and buyers can be sent via email, SMS/Text/Voice message to a mobile phone 106, through a traditional telephone number to a regular telephone 110, through a posting on a web page, text to speech 121, voice message, Instant Messaging, or any other communication/information systems comprised of Voice Over IP (VOIP) gateways 126, email servers 127 Text/SMS messaging systems 128.

The buyer has the option to register with the brokering system, select a user name, password and/or become uniquely identified for the next time they access the site/service after login. Once they are logged in their requests can be made without having to reenter their contact information.

When the request is posted, previously registered and listed sellers and sellers in partner sites that match the request as selected by the buyer are notified about the request. Once the buyer and sellers are matched, the business transaction can be handled independently or facilitated using the brokering system buying and selling services.

The website may have dynamic and/or static directory type listings. Static means information about the listing stays the same and applies to sellers or service providers. Dynamic means the listing information is applicable only for a short period of time. For example a static directory may include Attorneys, Auto Repair Shops, Dentists, Florists, Garden Supplies, Home Improvement, Insurance, Locksmiths, Movers, Pest Control, Physicians, Plumbing, Painting, Roof Repair, Limousines, Carpet Service, Handypersons, Housecleaning, Restaurants, Security, Storage, Vets, etc. A dynamic classified listing, for example, may include Antiques, Appliances, Art & Prints, Automotive, Business Equipment, Building Materials, Cameras/Video, Clothing, Collectibles, Computer Equipment, Food & Recipes, Furniture, Musical Instruments, Sports Equipment, Tickets & Events, Personal Ads, Employment, Rentals, Real Estate, etc.

Various embodiments of the present invention may provide a number of benefits to a buyer. For example, these embodiments eliminate the need for searching for needed products and services from several websites. Buyers can list their requirements and do not have to come back to the site each day to poll for possible sellers listings. Within the time frame specified by the user, the search continues automatically and the user is notified when a match is found. As another exemplary benefit, searching for services may be easier with the click of a button without having to manually go through each printed yellow page or online listing of seller's phone number, calling each of them and repeating the same information. Moreover, using these embodiments of the invention, the power to shop now shifts to the buyer with the ability to reach one or more of the listed sellers at once.

Figure 1:
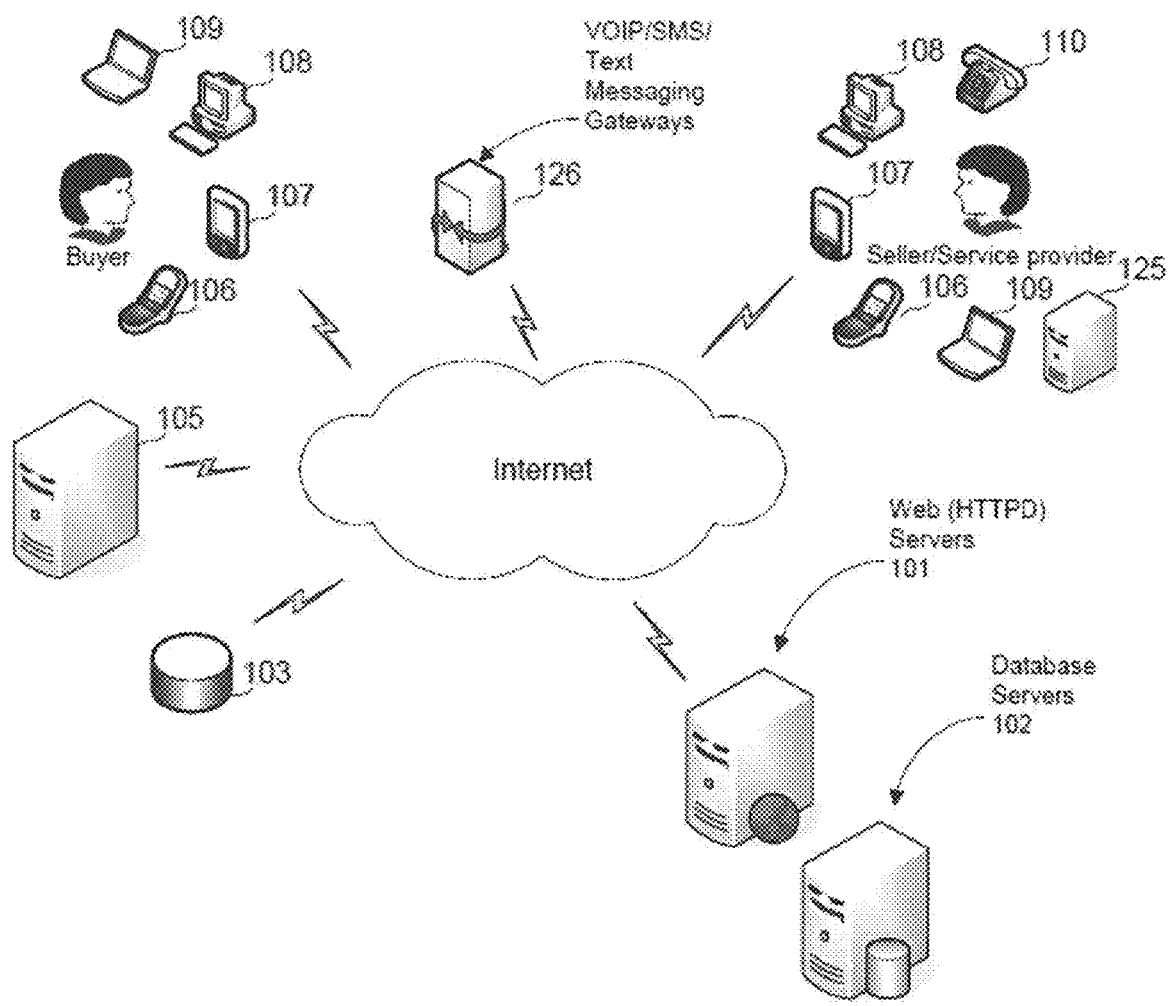
FIGS. 1 through 9 illustrate a system and method in an example embodiment providing an on-line venue in which buyers can anonymously communicate precisely what product or service they want to purchase by posting an interactive request to which a number of sellers can then directly respond.

As illustrated in FIG. 1, the buyer may be notified about a potential seller on mobile devices 106, 107, such as a mobile phone 106 or hand held computer 107. Buyers and sellers can instantly know of the responses to their listings. With the click of a button they can make a call and request more information or negotiate a price.

Various embodiments of the present invention may provide a number of benefits to a seller. For example, sellers receive qualified leads directly from seriously interested buyers. Moreover, sellers don't have to display price but understand their buyer's specific needs better and can negotiate with each, one on one. Also, the website can become a complimentary offering to partner seller's sites.

Figure 8:
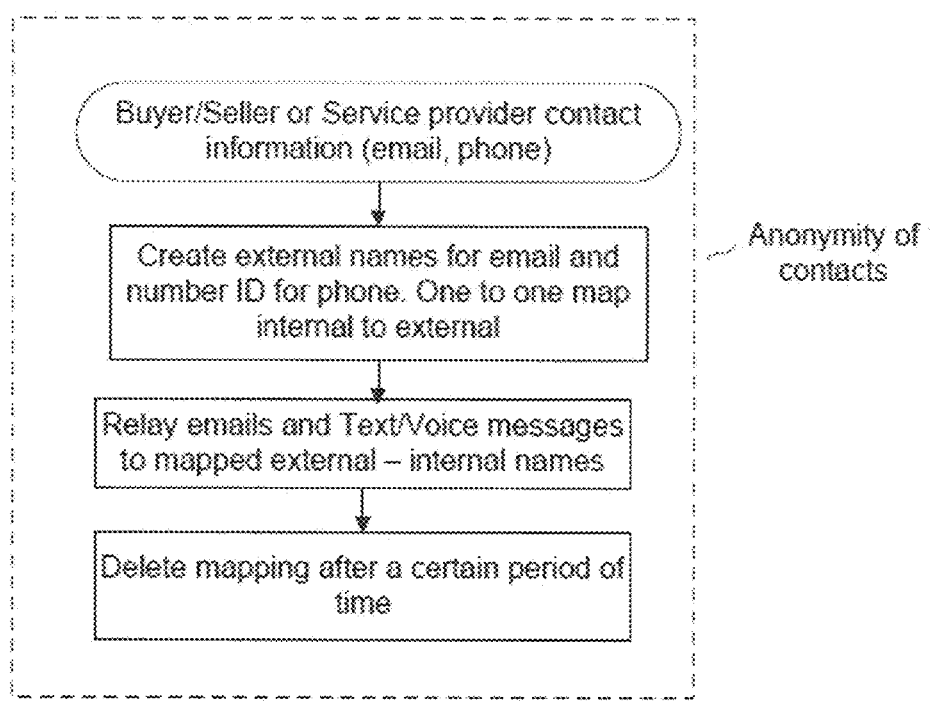

Embodiments of the invention may include any of the following features. A brokering system's online marketplace matching buyers and sellers. During a transaction or the lead up to a transaction, buyers and sellers can remain anonymous through anonymous email/Voice/SMS or Text message relay as seen in FIG. 8. They can, of course, by agreement end the anonymous communications at any time. A brokering system's online marketplace may also provide search and matching algorithms that pre-qualifies a buyer with sellers. A brokering system's online marketplace may also allow buyers to elect which sellers that can be contacted or sources to search for sellers.

A brokering system's online marketplace as seen in FIG. 6, for example, may use AJAX technology which may speed up processes of various embodiments of the invention and may improve the user interaction experience. Embodiments of the invention may be implemented at various steps from searching the category, displaying the form with location information to delivering the message, etc. The flow of information between the buyer and the website may include, for example: Category partially entered>display category list>Category completely entered>display form>location entered>list sellers to who request will be sent>submit>send the request for each sellers listed. Buyers may have their location mapped using IP address or location information enables automatic location selection.

Other exemplary features of the brokering system's online marketplace may include providing the site free to buyers, requiring sellers to pay a subscription to obtain information about a buyer's request, etc. For example, requesting periodic subscriptions, such as monthly or yearly subscriptions. The price for a subscription may vary based on location.

Other subscriptions may require fees from the sellers based on the number of transactions, the amount of a transaction, the number of notifications, or matches per cycle. Various sponsored messages may be sent within the email/Voice/SMS or Text messages sent to buyers as seen in FIG. 2. The website may include advertisers that pay a fee for advertising within selective sections. These advertisements may include banners, sponsored links, related or featured items (sponsored), most popular products within category (sponsored), etc. A reward may be returned to the buyer and/or the brokering system, perhaps as a percentage of the transaction. Moreover, all transactions may be tracked by the website.

The buyer motivated market place may be hosted on a web server 101 as seen in, for example, an Apache web server 101 using SQL, PHP, JavaScript, AJAX technologies. An exemplary web site may include any of the following features either singularly or in combination:

- Form parameters (structured and unstructured data input)—structured data refers to pre-created options and parameters about a product or service. Unstructured data input is any information about the buyer's need that is entered, which is not already defined in the product.
- Customized forms for specific locations and categories. The forms created in the brokering system under certain categories may not be applicable in all locations. Ex: they may not be using carpet for flooring in Mexico. The brokering system then creates customized local forms specific to certain locations and categories.
- Static directory listings information about the business only—not a temporary product or service offering. An example is the yellow pages listings.
- Dynamic classified listings information about product sale or special service offering—a listing that is only applicable for a short period of time. An example is the classified listings.
- Localized search by location city/locality or zip sellers can list at multiple levels and buyers can search at multiple levels. An example is the workers compensation insurance business can list itself in the entire state versus a local florist may only list to specific locality. Buyers can search only specific localities or an entire city. Matches will be made to local sellers and citywide/statewide/national sellers for that request. Searches can be filtered by postal codes and/or with radius matching.
- Mobile phone reach Voice/SMS/Text messaging to both buyers and sellers instantly—buyer's request is sent to sellers/service provider's mobile phones and they can connect back to the buyers on their mobile devices and phones.
- Alias list ex: cars and vehicles; an alias list provides several categories referred to by alternate names. Ex: Cars and Vehicles select Auto (multiple alias names can be added using the admin control for the category names. Ex: limos will also be matched when searched for limousines, airport shuttle, airport ride, stretch limos, etc.).
- When the buyer moves the mouse input device over a business name it displays seller's information.
- An Administrator is allowed access through web pages after authentication to create categories with form parameters and manage the information.
- An Administrator is allowed access through web pages after authentication to add country, state, city, locality and postal code and manage the information.
- Add your Business/service listing: is available for sellers to add their listing. Sellers can choose the options at various price levels ex: if they want Text/SMS/Voice messages, there is an extra price, or phone notification, pay a price per call. Nationwide listing will cost more than statewide, city wide, or just local listing (cheapest price). These options can be selected. Price may also vary with filter options ex: an auto dealer who only sells one type of car and wants filtered leads for that type will pay less than a dealer who sells more than one type of car and wants multiple filter results. The Administrator gets an email when a sellers listing is added for validation purposes.
- Geocoded IP address which determines the user location is used to match sellers using reverse postal code mapping and display.
- Geocode (latitude and longitude) is used to calculate distance between the buyer and sellers to limit display of results based on radius input.
- IP address to location matching is used to reduce the selection of cities to display. Example, when the user types S, there may be thousands of cities throughout the world. With IP address as an indicator, we search and match only results within that country or state from where that IP location originated.
- GPS or cell triangulation based location information from PC and mobile devices is used for location mapping.
- Memorized queries—buyer requests are saved in our system for a selected amount of time to match sellers.
- Responses mailbox—buyer and sellers can choose the option of keeping their messages they got from the other in their brokering system mailbox.
- Anonymity and privacy options—anonymity is maintained at both the buyer and seller sides when initiating contact or communicating through email/SMS/Voice/Text phone messages. Data entered by a buyer is not displayed to anyone other than who the buyer selected and not shared.
- Instant messaging (IM) to communicate—buyer requests can be sent to web based chat and instant messaging systems whereby sellers can respond instantly over the chat/instant messaging interface.
- General help and user notes for each category—buyers can write helpful comments suggestions and relevant useful information for each category in general.
- Click-to-Call from mobile phones from the message to buyer/seller—buyers and sellers can initiate a call to the number of the other party, from their email/SMS/Text/Voice message.
- Click-to-chat text IM or voice IM on a seller listing to individual sellers. Buyers can initiate an instant message (Text/Voice/Video) chat request from the web page. This chat conversation can occur within the brokering system's web pages or in separate web pages or client software after initiation.
- Click-to-chat or Click-to-call with text IM or voice IM Instant messaging from buyer/sellers email message as shown in FIG. 2.
- Web to phone voice messaging "we have a lead for you"—buyer requests are converted using text to speech from text technology and sent to one or more sellers to their phone and play the request also shown in FIG. 2.
- Partner external database 103 search capabilities—A buyer requests is matched with our partner database located anywhere, over the web.
- Time duration management—buyer requests are kept active for a specified time by the buyer. An example is looking to buy a car request is kept active for only 2 months (as selected by the buyer).

sellers Dashboard-Web Front System for customer response management—sellers can view the buyer requests on a dashboard with advanced features to sort, search and filter. They can initiate responses from this console, keep track of their responses to each buyer request and manage their customer interactions.

Integrate with SMS gateway services to send SMS messages to any cell phone in 100+ countries. SMS messages can be sent from the web service to any carrier around the world in each region as seen in FIG. 2.

Credit card payment method for sellers listing—sellers pay for listing service on the brokering system using their credit card or other web based payment methods. We may also collect payment offline through sales agents.

Language options—text strings are translated, stored and retrieved with language index for the forms, categories and locations. The brokering system's web pages will be displayed in the local language based on the browser language setting automatically or user selection. All the messages to communicate to buyer/sellers will be maintained in that language. Optionally, machine based or human based translations may be used to relay requests from one party to another.

Templates are needed for creating a custom look and feel for partners. The brokering system look and feel can be customized to match our partner brand or co-brand. Using CSS definition and user interface parameters, can match colors, fonts and images to partner sites.

Favorite sellers' bookmarks and referrals—after the buyers register with the brokering system they can create a Bookmark to add their preferred sellers. They can then share this list of preferred services/service providers with their friends and family for recommending the sellers or sharing their experience. Sellers may reward the buyers for referring them to new buyers.

Anonymous bidding—FIG. 8 illustrates that buyer requests can be posted to be seen by sellers. The postings for requesting product/service can optionally remain anonymous. Sellers can post responses to the buyer requests and can also remain anonymous. Both buyers and sellers may choose nick names to be identified but remain anonymous. This feature enables open negotiation and bidding. Competitive sellers may outbid others with price or service features/support/quality promise and other terms.

Ability for sellers to add, edit delete their listing. Sellers can publish their instant sales/deals, daily specials or other promotional information through their account after sign up. They can update their content such as audio, video, images, data, discount coupons, discount data, discount coupons and/or discount liners of text that indicate special promotions.

Sellers can maintain a list of their buyers list in their account to send updates and notifications, marketing promotions.

Figure 10:
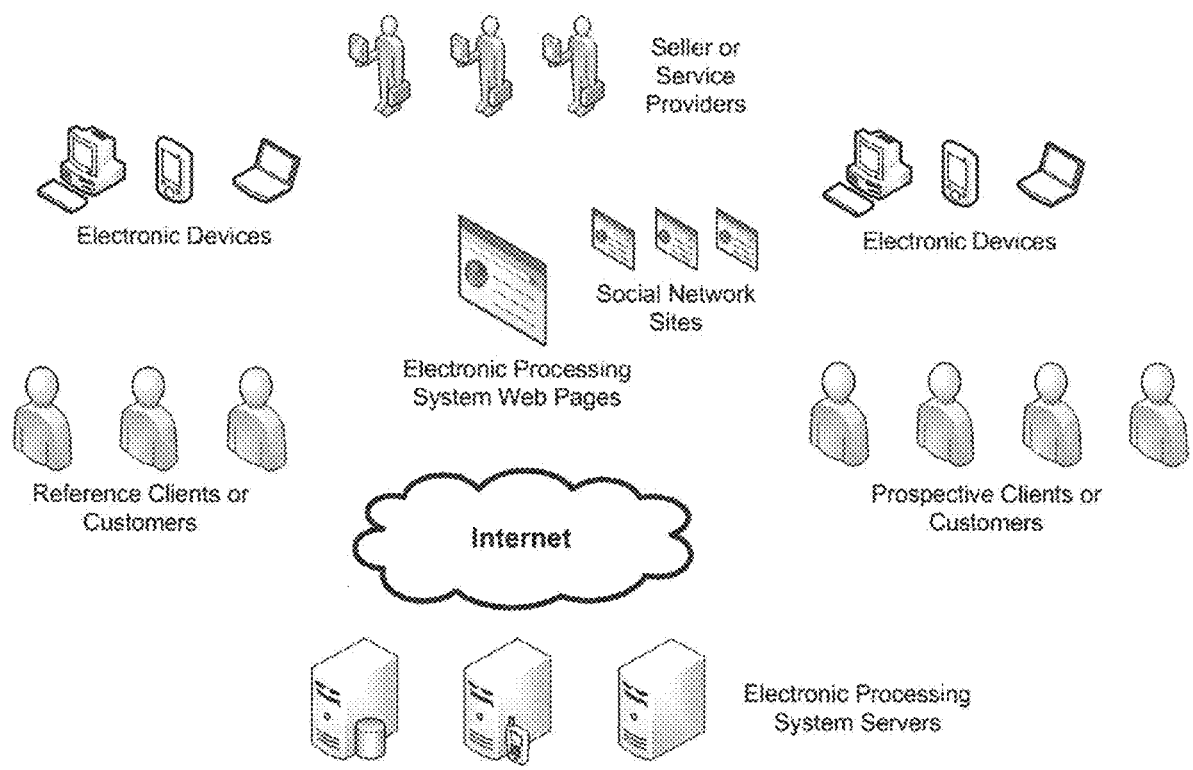
FIGS. 10 through 12 illustrate the system components and users pertaining to the invention.

Social networking aspects: both buyers and sellers can maintain their circle of friends, family and professional association with allied businesses and partners. FIG. 10 provides an illustration of parts of that.

Friends will build their favorite list of service providers that they can share on their social networks. Local businesses can do the same. An example is an auto service can be partnered with windshield replacement service, detailing service or audio installation service.

A trusted business can refer their customers to other partner services, and those other partner services might refer customers back to the trusted business as well.

Reviews and Ratings—detailed reviews including questions of relevance and importance to each category is created, a point system is assigned and average ratings for each of those answers is displayed.

Some examples for doctors are: how good did they treat you? Did they make you wait? Would you refer them to your friends? Do they know the modem treatments?

Some examples for limos are: Were they on time? What rating would you give to the quality of their car? Was the driver polite? Were they professionally dressed?

In one example, a web server system uses PHP with AJAX and/or MySQL database(s) 102. Alternate systems, platforms, coding languages and databases may be used. The core engine is designed to be highly responsive and scaleable. Structured database queries may be setup with variable fields for each form. Listings may be quick searchable and sorted in alphabetical order. Queries may be saved and retrieved for matches each time new data is added in that category as seen in FIG. 1. The system interfaces are modular to interface with internal database 102, external database 103 with queries or API. (There are other ways to implement the logic including but not limited to Java, JSP, Perl, Cold Fusion, ASP, Ruby on Rails or other databases such as Postgress SQL, MS SQL, Oracle®, etc.)

Figure 3:
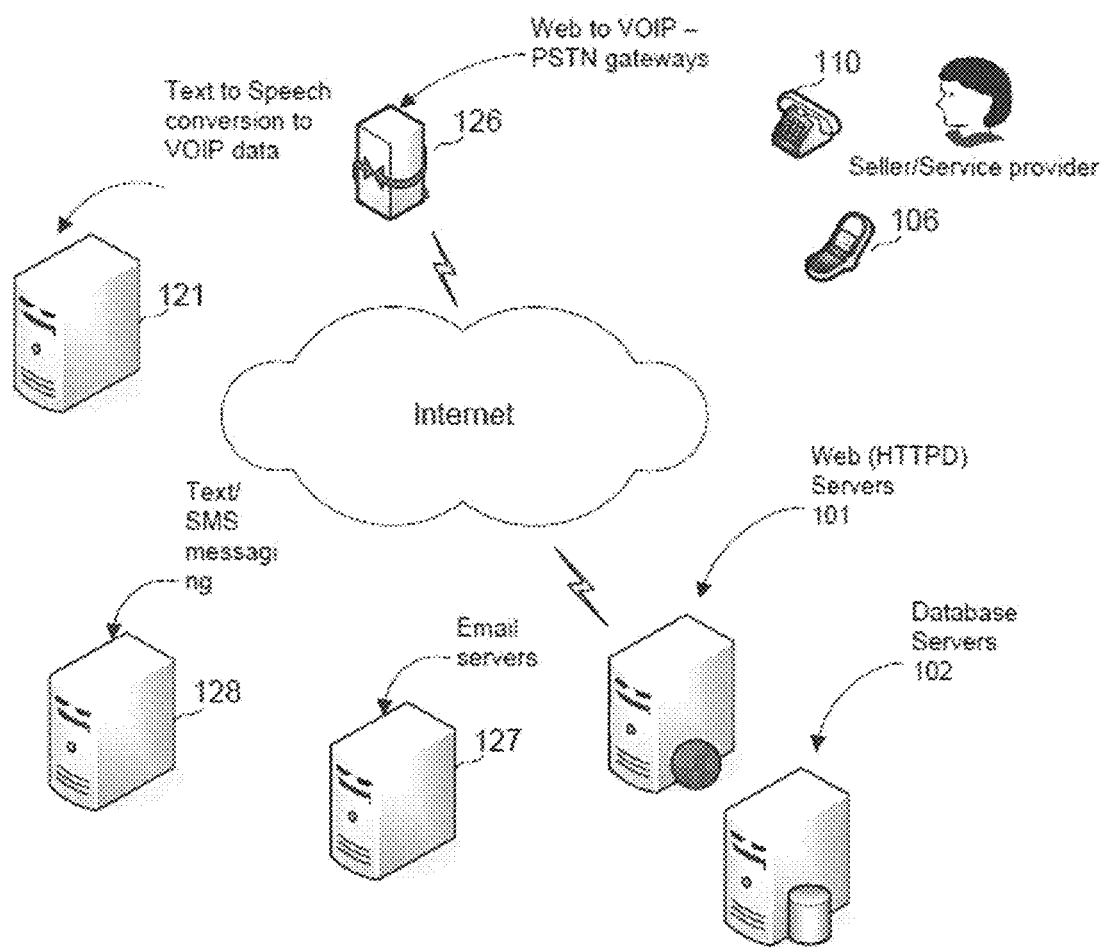

The customized forms with database entries can be adapted with a front-end interface to create new applications instantly without reprogramming. The core product consists of the following modular components, integrated seamlessly with well-defined interfaces:

Core database 102 (Categories, Location, User information) as seen in FIGS. 1-3.

Common Classes, Libraries (sessions, image handling, etc.).

User front-end-CSS/Templates.

Personal mailbox bins.

Search and match text pattern matching modules used for categories, keywords, location and filter fields.

Notification module for email/Text/Voice/SMS messages.

Figure 7:
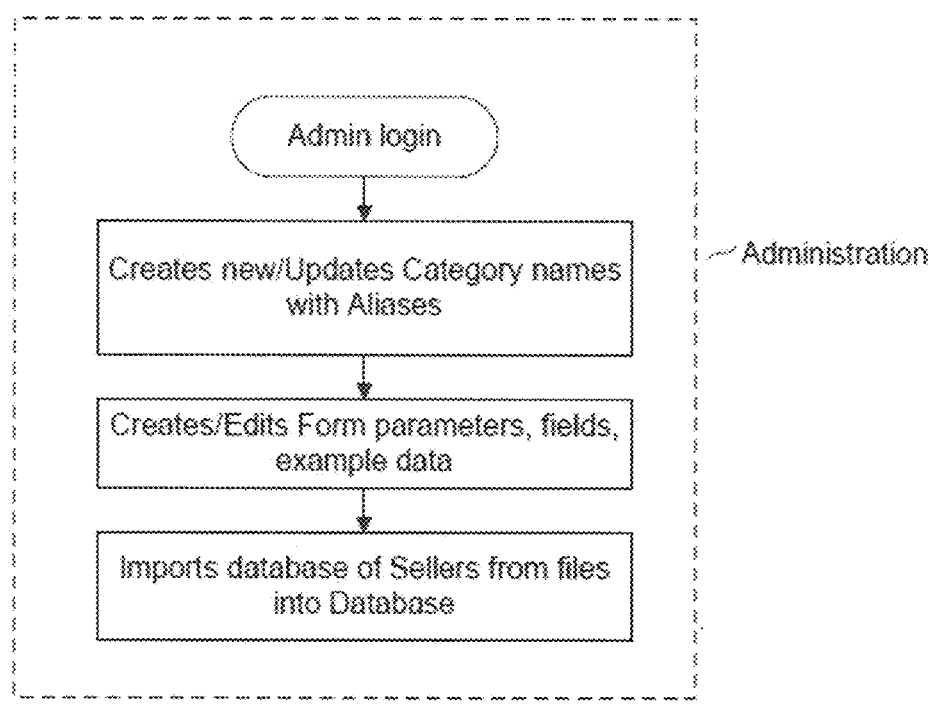

Form creation component as seen in FIG. 7.

Interface to internal and external data sources and/or API for accessing information from partners and affiliates.

Mobile data exchange module to communicate to mobile devices and phones.

Time duration management for managing the time period during which a request is maintained.

Business listing module.

Security Layers.

Advertisement & Promotion engine.

Mobile interface (adapted, formatted version).

The system may be initially designed, for example, to accommodate 300,000 registered users and 1,000 simultaneous users and yet be scalable to accommodate more users as needed. The website may be hosted at multiple locations and on multiple servers and may comprise clustered web 101 and database servers 102.

A website embodying many of the embodiments of the invention may be configured to provide editing, creation and deletion authorization to an administrator or other user as seen in FIG. 7. The parameters for each category can be entered without needing to code the Form. Each parameter can be specified with the format and length of the fields. Aliases can also be created so when related search terms are used by the buyer, they will refer to the category as matched in the alias list. List your Business/service field can also be setup specific to the category.

Figure 9:
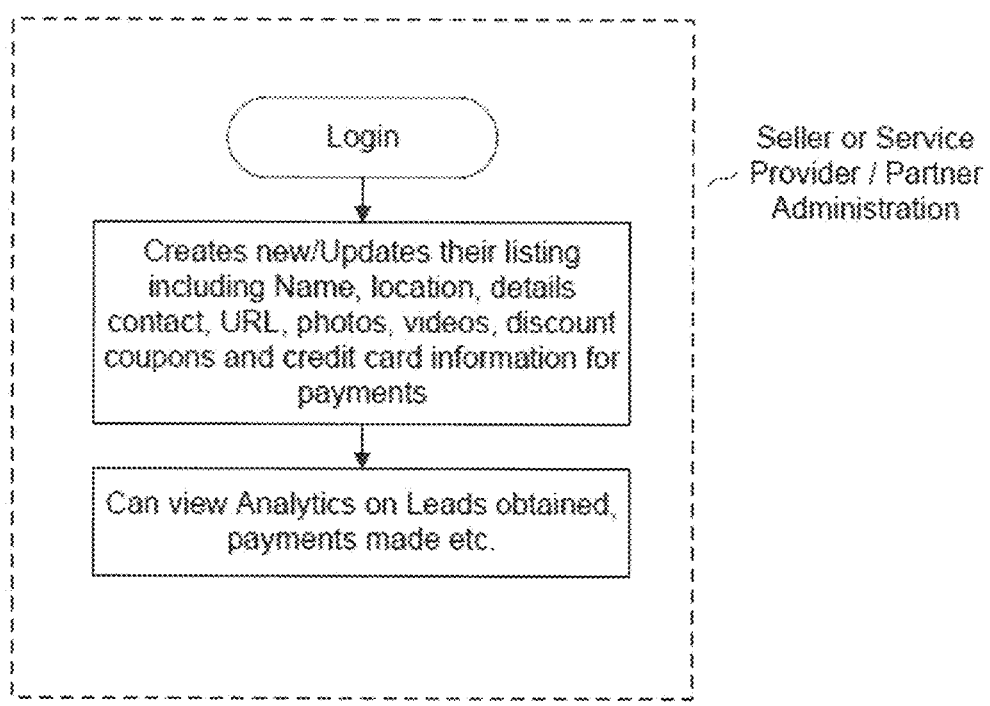

FIG. 9 illustrates in another embodiment of the invention where sellers can add their business, services and/or products by clicking a button and logging. The name of the button or link may vary depending upon the category, for example, List your service, List your Practice, List your Dealership etc. Sellers can specify their specialization or service area, for example, Neurologist, BMW® Dealer, etc. Sellers can choose their geographic coverage—city wide, multiple cities, entire state, country wide, worldwide, or to only a specific locality or metro area within a city. The price for listing varies based on the area of listing coverage.

As seen in FIGS. 1-3, sellers may choose to receive leads by emails on their computers 108 laptops, 109 or mobile devices 106, 107 or SMS/Text messages on their cell phones 106. In another embodiment, sellers can also choose to get leads over the voice telephone 110 or cell phones 106 with text to speech converted voice messages. Accordingly, sellers may receive a message through their phone that a buyer is ready to purchase. Moreover, the sellers may be prompted, for example, to press zero to be connected with the buyer, whereupon the buyer and sellers can be connected over the phone or through text messaging using text to speech tools. Sellers may register and login to see the messages they received from interested buyers in their message box.

Figure 11:
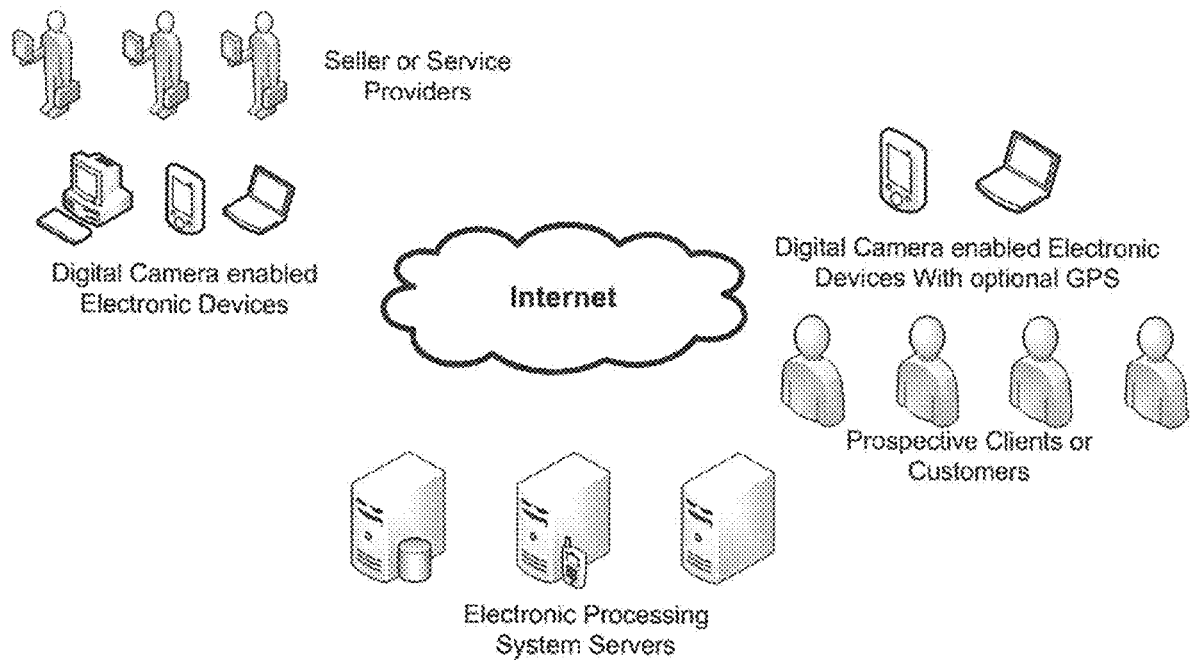
Figure 14:
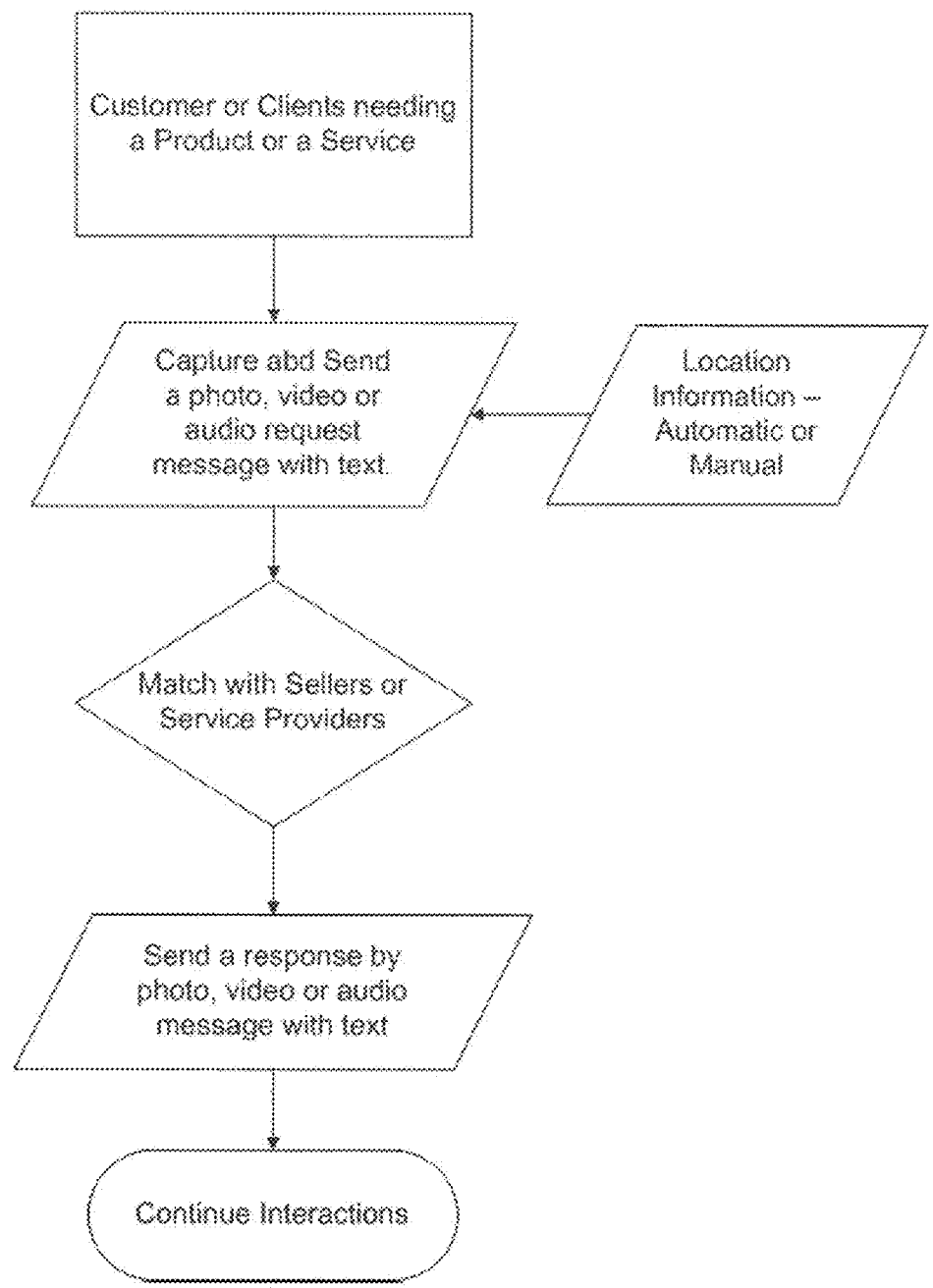

Certain embodiments of the invention cater to the needs of connecting localized products, services and/or businesses with consumers. They can share their specific solutions to problems and suggestions with the other users in their online community. Users can rate business and enter their experiences. Their content can include text, voice, audio or video. FIG. 11 illustrates an example of this. A process for implementing this is shown in FIG. 14.

Information from buyers and/or sellers may be matched into categories. For example, typed categories for products and services are matched with the listed categories and aliases in the system. Location matching is done for cities and localities with names and zip codes. Sellers can add filters based on their product/service preference, for example, an auto dealer may filter based only on a car maker such as Mercedes-Benz® or BMW® and no other makes. Sellers can use ctrl mouse click to select multiple filters or categories. These parameters are stored as filters in the DB and when buyer chooses the make, can reduce the listings to only those that match and display only the filtered results on the right navigation bar. For example, a first buyer chooses doctors and then when the form loads, buyer selects Orthopedist the right hand side only will then display the filtered list using AJAX.

Location mapping may be provided using IP location mapping automatically (helps to reduce the number of cities displayed). Buyer can override and select another country or state different from the default value now displayed. Custom country and/or local forms may be used. If there is a local custom form, that is used instead of the default.

In another embodiment of the invention the web site may have the ability to add other languages. The language may be based upon browser language and can be overridden by user input. Only buyers and sellers that have the same language preference may have a preference when matching.

In yet another embodiment of the invention FIG. 8 shows that double blind anonymous emails/SMS or Test Messages relaying for buyer and seller communications may be used with the ability to disable the relaying, if desired by the buyer/seller. A listing number is generated and saved for each listing and used for deleting listings in memory as emailed by users to remove their listing.

In yet another embodiment of the invention, FIG. 9 shows that sellers can add their website link, online photos or videos. Sellers can add discount coupons with codes that can be redeemed by the buyer. Alternately, buyers can print the coupons and use it to redeem the discounts. Photos and videos can be added by uploading the images and video files or by linking to an outside website that serves the image and video. The content, including but not limited to, photos, video, discount coupons, maps, contact information, text description and web links are displayed when sellers are listed.

In another embodiment of the invention, the system may search for outside seller sites, for example, sfgate.com, craigslist.com, alibaba.com, oodle.com, etc. The system may also provide a dynamic sellers listing for cars from owners, personals, job openings, musical instruments, etc., within the website.

In yet another embodiment of the invention, a mobile version of the website may be available, for example, for mobile smart phones or browser phones 106, hand held computers and personal data assistants (PDA) 107. Mobile versions may incorporate a simpler interface adapted for small screen and keyboard. AJAX may also be replaced by standard mobile browser code that will work. If the device provides location information, it can be used as the default with location mapping, that the user may override.

Figure 12:
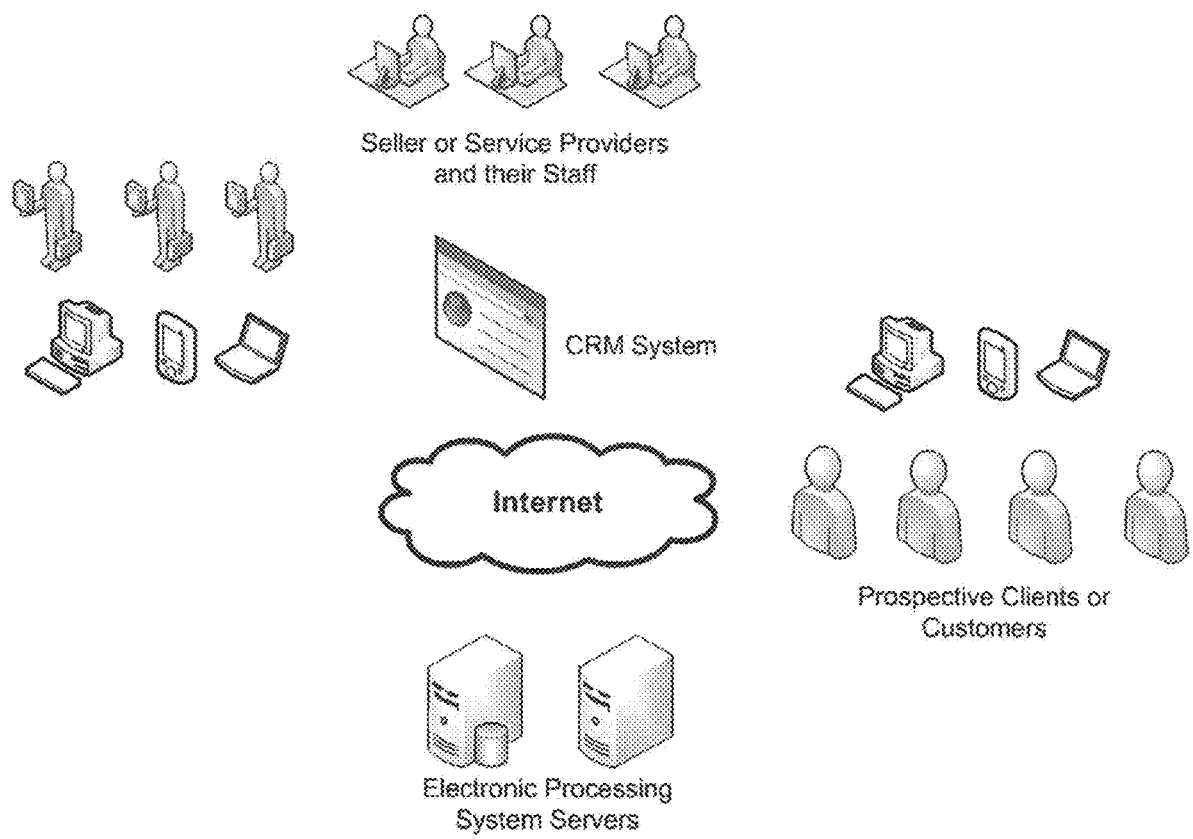

In another embodiment of the invention as illustrated in FIG. 12, the information about the buyer's request is sent to another information system, typically a Customer Resource Management (CRM) system 125 or other proprietary information system. This can be in addition or alternative to the email/Voice/SMS/Text message being sent.

In another embodiment of the invention illustrated in FIG. 4, the data entered by the buyer is validated with rules. Example: an email field is validated with multiple rules such as checking for the presence of the @symbol, a valid domain name, no special characters etc., validating the name field may include checking for minimum number of characters, no special characters or numbers etc., checking for bad words against a list of predefined foul words and replacing or deleting them, checking for phone numbers entered to be of valid format and other validation mechanisms for data input. Checks are also made to ensure that a human is entering the data by means of a CAPTCHA (images displayed to be entered by the person manually). Additional validation may include checking for detection and prevention of multiple submissions within a given time based on the IP address.

In another embodiment of the invention, the users may be channeled from other external websites 105 such as search engines, portals or partner sites, thereby bypassing the category search. Ex: traffic from a portal or search engine when someone searches for doctors in Los Angeles will be sent to the brokering system to be matched with potential listings in our own or external databases 103.

Figure 5:
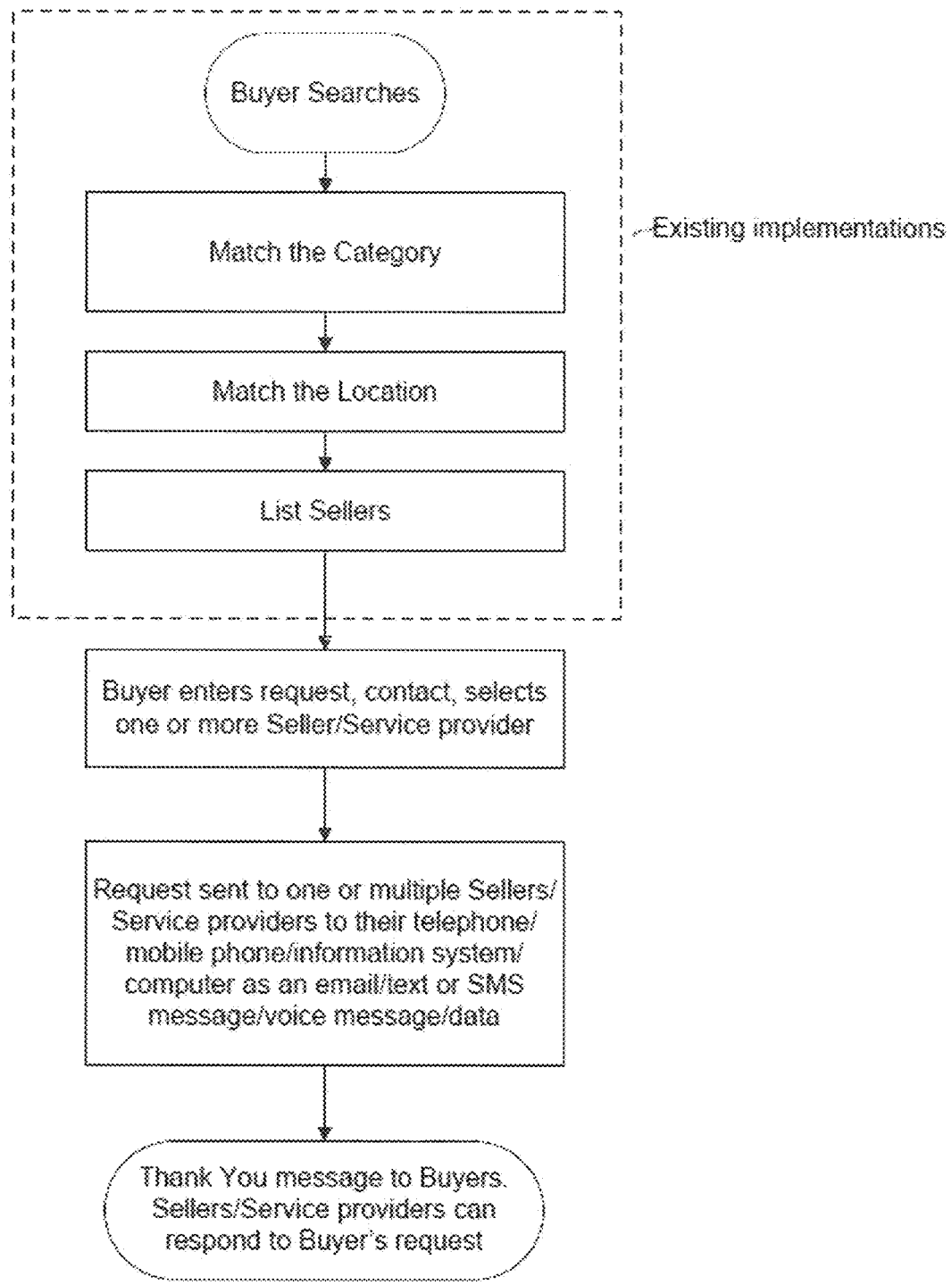

In yet another embodiment of the invention illustrated in FIG. 5, the mechanism of sending a buyer request to one or more sellers is integrated within another existing listing system, including several websites that provide listing information. In such scenarios, buyers can select one or more of the services, fill in their request and submit that request to be sent. In some cases, the sellers may or may not be listed for the buyers to see them.

Security Layers to prevent abuse of application with
    CAPTCHA images, requiring interactive input of visual displayed character strings manually by a human user. Checking the rate at which a request is generated from an IP address (velocity of access), filtering bad words automatically, limiting user data input to range of valid data, requiring valid credit card information from sellers and triggering notifications to the administrator on new addition of listings for verification are some of the methods implemented.

Advertisement & Promotion engine to manage relevant advertisements and sponsorships in categories and locations.

Mobile interface adapted, formatted version for varying devices and browser rendering formats including XHTML versions and device specific display modifications.

In yet another embodiment of the invention, the buyer could chat with the seller using a messaging system (chat or instant messaging) comprised of Text, Audio or Video.

In yet another embodiment of the invention illustrated in FIG. 9, the sellers are provided with built-in analytics to track their performance ranging from traffic sources to lead details. Partners, both on the seller side and buyer traffic side can be added to the system to enable revenue sharing. They can also track their performance and payments using the billing and analytics system. A credit card billing system is implemented with setup fees and automated recurring billing for lead fees payment. The system is designed for worldwide use with multiple currencies and localization.

FURTHER EMBODIMENTS

The brokering system provides an on-line venue in which buyers can anonymously communicate precisely what product or service they want to purchase by posting an interactive request that a number of sellers can then directly respond to.

This concept reverses the traditional model for classified listings or directory advertising by promoting the buyer's interests in directly matching their needs with qualified vendors. In contrast to what Craigslist®, Yahoo®, Google®, and others provide, where the buyer has to search within each sellers and then send their request. The brokering system broadcasts buyer's needs to relevant/selected sellers.

This concept takes the burden off of the buyer in finding the right products and services by self-qualifying the lead to proactive prospective sellers.

How it Works

The buyer types yellcastexample.com or www.yellcast-.example.com in their web browser. Buyer could optionally register with the brokering system, selects a user name and password. The site main page features a category/product/service search box appears where the buyer types what he/she is looking for. Within a few characters of typing, relevant category names are displayed below, which can be clicked to select. Alternately, buyer can type the entire category name and hit enter. The next screen will enable the user to select the location such as city/locality/zip and radius. Based on the location businesses that match the postal code and radius or city and locality are displayed, along with a request form. The request form allows the buyer to select a product or service category and how they would like to be notified. Notifications can be via email, SMS mobile phone notification, or through a traditional telephone/cell phone number. Once the request is ready for posting, the buyer receives a confirmation message on a web page.

When the request is posted, previously registered or partner sellers that match the request are emailed the lead and can proactively respond to the seller. Once the buyer and sellers are matched, the business transaction can be handled independently or facilitated using the brokering system buying and selling services.

Sample Listings:

Static Directory Listings: Attorneys, Auto repairs, Dentists, Florists, Garden supplies, Home improvement, Insurance, Locksmiths, Movers, Pest Control, Physicians, Plumbing, Painting, Roof repair, Limousines, Carpet service, Handypersons, Housecleaning, Restaurants, Security, Storage, Vets, . . . .

Dynamic Classified Listings:

Antiques, Appliances, Art & Prints, Automotive, Business equipment, Building materials, Cameras/Video, Clothing, Collectibles, Computer equipment, Food & Recipes, Furniture, Musical Instruments, Sports Equipment, Tickets & Events, Personal Ads, Employment, Rentals, Real Estate, . . . .

Each listing will have a form in which the user inputs the specific request with as much relevant information.

Applications

The brokering system caters to the needs of connecting localized product/service businesses with consumers. Buyers can list what they specifically want in their local area and get connected to the right businesses. They can also share their specific solutions to problems and suggestions with the other users in the community.

Buyer Benefits

For the end user, the brokering system eliminates the need for searching for needed products and services from several websites. Users can list their requirements and do not have to come back to the site each day to poll for possible sellers listings. Within the time frame specified by the user, the search continues automatically and the user is notified when a match is found.

Searching for services becomes easier with the click of a button without having to manually go through each printed yellow page and phone number, calling each of them and repeating the same information.

The power to shop now shifts to the buyer with the ability to reach all the listed suppliers at once.

With the ability to notify on mobile phones, buyers and sellers can instantly know of the responses to their listings. With the click of a button can make a call and can know more information or negotiate price.

Seller/Service Providers Benefits

Businesses benefit by getting qualified leads directly from seriously interested buyers.

Sellers don't have to openly display price but understand the need better and negotiate with each buyer, one on one.

They can better understand the customer requirements, maintain a closer relationship and address their future needs as well.

The brokering system becomes a complimentary offering to its partner sellers' sites, yellow pages and classified listings.

Details

Buyers can remain anonymous until the deal is closed. A radio check box that says "make anonymous" which is next to their email ID. We enable a relay mechanism for emails by creating a random email address.

Search and match technology pre-qualifies sellers for buyers. Buyers can elect in which databases they wish to search and sellers to be contacted. Buyers can view more details about the sellers, before they opt to contact them.

Multiple sellers can be reached through various ways—phone, email, SMS/Voice/Text message, instant messaging.

The brokering system breaks the ineffective "old style" model of advertising where advertisements are displayed with further hopes of attracting targeted buyers. The "old style" model was adapted from the television and radio methods of broadcast, where buyer input was not possible. In our service, buyers come with the need to buy a product or service, search with specific requirements, get matched locally and can instantly connect to sellers.

Buyers can rate and rank sellers—service quality, relevance and merits/demerits of a particular seller can be reviewed and rated based on past experience from buyers. Buyers can provide useful information relevant to the category and location for each type of service/product to help others.

AJAX technology speeds up the process user search and navigation and improves the User Interaction and usability. AJAX is a good way to implement this at various steps from searching the category, displaying the form with location information to delivering the message. AJAX Flow: Category partially entered>display category list>Category completely entered>display form>location entered>list sellers to whom request will be sent>submit>send the request, displaying a green button for each sellers listed.

Revenue Models

Sellers pay monthly or yearly subscription to obtain information about buyer's request. Price can vary based on the area of coverage (specific locality only, single city only, multiple cities, entire state, country) or functional elements (sellers receiving SMS/Text/Voice messages or phone notifications, options to add just photos or videos for an extra fee), etc.

Premium features are fee based on a per transaction basis.

Monthly subscription (or per ad cycle).

Advertisers pay a fee for advertising within selective sections. Standard Advertising (banner).

Sponsored Links appear on right side of page.

Matched Links appear in Matched Section.

Ready to Sell Links by rotational or rating and ranking.

Sponsored messages on email/SMS/Text/Voice Message.

The site is free for the buyers but may offer a premium service.

Lead generation revenues as well as transaction fees.

Buying Resources (sponsored links).

Related or Featured Items (sponsored links).

Most Popular Products within Category (sponsored links).

Reward return from sellers to buyer through the brokering system, by providing the brokering system a percent as transaction fees.

Architecture & Technology

The brokering system is developed using PHP scripting with AJAX and MySQL database. The core engine is designed to be highly responsive and scaleable. Structured database queries will be setup with variable fields for each form for specific application. Listings are quick searchable and sorted in alphabetical order. Queries can be saved and retrieved for matches each time new data is added in that category. The system interfaces is modular to interface with internal database and external database with XML queries. The customized forms with database entries can be adapted with a front-end interface to create new applications instantly without reprogramming.

The core product comprises the following modular components, integrated seamlessly with well-defined interfaces:

Core database
User front-end
Personal mailbox bins
Search and match
Notification module
Form creation component
XML/API interface to external data sources
Mobile data exchange module
Time duration management
Business listing module
Advertisement & Promotion engine XML Interface: We define an XML/API interface to transmit the listings to other sites. This interface has the fields and data for each listing created and instantly transmitted for matching and responses.

Listing in Memory: Each time a listing is created, it will be saved. Each time a new sellers listing is added, we will check for matches against existing saved listings.

Listing number: This will be generated and saved for each listing and used for deleting listings in memory as emailed by users to remove their listing. If a user forgot the listing number, the listing can be identified with the listing email and the content.

Recurrent response prevention: There will be checks to prevent responses resent from the same sellers email address/user to the buyer email address/user. An example is a business that checks the web pages for the buyer and sends a response may have already sent a response from the listing notification sent to them. This can be prevented by checking buyer, sellers email Ids and listing message.

SMS window: SMS messages are shorter than the email messages and optimized for small screen display.

Archives: We will maintain an archive for each registered user to preserve their history of listings.

Soundex: Similar sounding words matching for text searches.

Localization

1. Get country and state using IP location mapping automatically (to reduce the number of cities displayed). However, buyer can override and select another country or state different from the default value now displayed.

2. For hint examples, show local currency for that country or chosen location.

Filter and Matching

Filters are used based on seller's preference. Ex: an auto dealer who only deals with Mercedes-Benz® and BMW® and no other makes. Sellers can use ctrl-mouse-click to select multiple. These options are stored as filters in the DB and when buyer chooses the make, can reduce the sellers' listings to only those that match and display only the filtered results on the right navigation bar. An example is that first the buyer chooses doctors and then after the form loads, the buyer selects Orthopedist and when this occurs, the right hand side only will then display the filtered list.

Listing sellers may list under multiple cities and localities. Sellers can list their business under multiple countries, states, cities and localities. Sellers can list multiple postal codes when they add their business.

Additional Product Features for Some Embodiments

Categories/Aliases, Form Generator Administration
AJAXFlow
ListYourBiz Page
buyer Search Page—Admin access only
buyer Search Results Page—Admin access only
Foul language check and replace Security CAPTCHA image data input
Email validation
Phone number validation
Information pages on footer
Location Management—US states, cities added
Initial Categories, Alias names and Form Parameters-15 categories
Single sponsor on site and Text messages
Filtering based on specific products/services
sellers adding photos, videos, URL, discount coupon images, map display
Language strings for translation-English, Spanish
Batch mode DB import
sellers add listing—select multiple cities & localities
sellers paid lead Revenues
buyer traffic and sellers add Partner Management
Analytics-sellers and Partners
Integration with external CRM systems
Local ad sponsor support
Localization based on auto location
Anonymous email connections
Language selection, currency, localized forms
Reviews and Ratings
buyer added photos/videos for requests
Auto location narrowed to state
Coverage areas based and premium options
Local ad enabled for paid sponsors
Discount coupons code and tracking Examples of Categories
  Accounting services
  Acupuncture
  Auto audio
  Auto glass
  Auto Insurance
  Auto service
  Auto Warranty
  Autos new/used
  Bankruptcy Lawyers
  Boat Maintenance
  Boat Supplies
  Child care
  Chiropractic
  Cosmetic Products & Cosmetic services
  Cosmetic Surgery
  Cruises
  Dating services
  Debt Settlement
  Dentists
  Divorce Lawyers
  Dry Cleaning
  education/training
  Employment services
  Flower Delivery
  Food Delivery (Meat, Fruit, Veggies, Groceries)
  Hair Removal
  Health & Fitness
  Health Insurance
  Home Cleaning
  Home furnishing
  Home improvement
  Home Loans
  Home security
  Interior Design
  Jewelry
  Laser Eye treatment
  Limousines
  Moving services
  Orthodontics
  Pharmacy
  Pool Cleaning
  Solar Power installation
  Trust, Wills/Estate planning Lawyers
  Vacation Shares
  Yoga Examples of Fields Used for Specific Categories
Table structure for table 'Airport_Taxis' CREATE TABLE 'Airport_Taxis'

```
(
  'Airport_TaxisiD' int(6) unsigned NOT NULL auto_increment,
  'CID' int(6) default NULL,
  'numpass' varchar(50) default NULL,
  'servicedate' varchar(50) default NULL,
  'picklocation' varchar(50) default NULL,
  'droplocation' varchar(50) default NULL,
  'picktime' varchar(50) default NULL,
  'airline' varchar(50) default NULL,
  'notes' varchar(250) default NULL,
  'dflag' int(4) default '0',
  PRIMARY KEY ('Airport_TaxisiD')
) ENGINE=MyiSAM DEFAULT CHARSET=latinl
AUTO_INCREMENT= I ;
```

Table structure for table 'Autos' CREATE TABLE 'Autos'

```
(
  'AutosiD' int(6) unsigned NOT NULL auto_increment,
  'CID' int(6) default NULL,
  'make' varchar(50) default NULL,
  'model' varchar(50) default NULL,
  'neworused' varchar(50) default NULL,
  'year' varchar(50) default NULL,
  'color' varchar(50) default NULL,
  'options' varchar(50) default NULL,
  'price' varchar(50) default NULL,
  'financing' varchar(50) default NULL,
  'warranty' varchar(50) default NULL,
  'notes' varchar(250) default NULL,
  'dflag' int(4) default '0', PRIMARY KEY ('AutosiD')
) ENGINE=MyiSAM AUTO_INCREMENT=2 DEFAULT CHARSET=latinl
AUTO_INCREMENT=2;
```

Table structure for table 'Doctors' CREATE TABLE 'Doctors'

```
(
  'DoctorsiD' int(6) unsigned NOT NULL auto_increment,
  'CID' int(6) default NULL,
  'speciality' varchar(50) default NULL,
  'insurance' varchar(50) default NULL,
  'appttime' varchar(50) default NULL,
  'notes' varchar(50) default NULL,
  'dflag' int(4) default '0', PRIMARY KEY ('DoctorsiD')
) ENGINE=MyiSAM DEFAULT CHARSET=latinl
AUTO_INCREMENT=l;
```

Table structure for table 'Flowers' CREATE TABLE 'Flowers'

```
(
  'FlowersiD' int(6) unsigned NOT NULL auto increment,
  'CID' int(6) default NULL,
  'occasion' varchar(50) default NULL,
  'flowertype' varchar(50) default NULL,
  'pricerange' varchar(50) default NULL,
```

```
    'dellocation' varchar(50) default NULL,
    'deldate' varchar(50) default NULL,
    'deltime' varchar(50) default NULL,
    'notes' varchar(250) default NULL,
    'dflag' int(4) default '0', PRIMARY KEY ('FlowersiD')
) ENGINE=MyiSAM DEFAULT CHARSET=latin1
AUTO_INCREMENT= 1;
```

Table structure for table 'Home Loans' CREATE TABLE 'Home_Loans'

```
(
    'Home_LoansiD' int(6) unsigned NOT NULL auto_increment,
    'CID' int(6) default NULL,
    'proptype' varchar(50) default NULL,
    'homevalue' varchar(50) default NULL,
    'loanamf' varchar(50) default NULL,
    'loantype' varchar(50) default NULL,
    'ratetype' varchar(50) default NULL,
    'downpay' varchar(50) default NULL,
    'creditrating' varchar(50) default NULL,
    'income' varchar(50) default NULL,
    'payments' varchar(50) default NULL,
    'hometype' varchar(50) default NULL,
    'curmortgage' varchar(50) default NULL,
    'currate' varchar(50) default NULL,
    'notes' varchar(250) default NULL,
    'dflag' int(4) default '0',
    PRIMARY KEY ('Home LoansiD')
) ENGINE=MyiSAM AUTO_INCREMENT=2 DEFAULT CHARSET=latin1
AUTO INCREMENT=2;
```

Table structure for table 'Home Rentals' CREATE TABLE 'Home_Rentals'

```
(
    'Home_RentalsiD' int(6) unsigned NOT NULL auto_increment,
    'CID' int(6) default NULL,
    'rentaltype' varchar(50) default NULL,
    'location' varchar(50) default NULL,
    'movedate' varchar(50) default NULL,
    'area' varchar(50) default NULL,
    'price' varchar(50) default NULL,
    'rooms' varchar(50) default NULL,
    'leaseterm' varchar(50) default NULL,
    'cargarage' varchar(50) default NULL,
    'credit' varchar(50) default NULL,
    'furnished' varchar(50) default NULL,
    'pets' varchar(50) default NULL,
    'notes' varchar(250) default NULL,
    'dflag' int(4) default '0',
    PRIMARY KEY ('Home_RentalsiD')
) ENGINE=MyiSAM DEFAULT CHARSET=latin1
AUTO_INCREMENT=1;
```

Table structure for table 'Lawyers' CREATE TABLE 'Lawyers'

```
(
    'LawyersiD' int(6) unsigned NOT NULL auto_increment,
    'CID' int(6) default NULL,
    'areasoflaw' varchar(50) default NULL,
    'casesummary' varchar(250) default NULL,
    'appttime' varchar(50) default NULL,
    'notes' varchar(250) default NULL,
    'dflag' int(4) default '0', PRIMARY KEY ('LawyersiD')
) ENGINE=MyiSAM DEFAULT CHARSET=latin1
AUTO_INCREMENT=1;
```

Table structure for table 'Limos' CREATE TABLE 'Limos'

```
('LimosiD' int(6) unsigned NOT NULL auto_increment,
'CID' int(6) default NULL,
'svctype' varchar(50) default NULL,
'vehicletype' varchar(50) default NULL,
'numpass' varchar(50) default NULL,
'picklocation' varchar(50) default NULL,
'droplocation' varchar(50) default NULL,
'pickdate' varchar(50) default NULL,
'picktime' varchar(50) default NULL,
'dropdate' varchar(50) default NULL,
'droptime' varchar(50) default NULL,
'price' varchar(50) default NULL,
'notes' varchar(250) default NULL,
'dflag' int(4) default '0', PRIMARY KEY ('LimosiD')
) ENGINE=MyiSAM DEFAULT CHARSET=latin1
AUTO_INCREMENT=1;
```

Table structure for table 'Movers' CREATE TABLE 'Movers'

```
('MoversiD' int(6) unsigned NOT NULL auto_increment,
'CID' int(6) default NULL,
'type' varchar(50) default NULL,
'movingfrom' varchar(5 0) default NULL,
'movingto' varchar(50) default NULL,
'storage' varchar(50) default NULL,
'movingdate' varchar(50) default NULL,
'movingtime' varchar(50) default NULL,
'notes' varchar(250) default NULL,
'dflag' int(4) default '0', PRIMARY KEY ('MoversiD')
) ENGINE=MyiSAM AUTO_INCREMENT=2 DEFAULT CHARSET=latin1
AUTO_INCREMENT=2;
```

Table structure for table 'Plumbers' CREATE TABLE 'Plumbers'

```
('PlumbersiD' int(6) unsigned NOT NULL auto_increment,
'CID' int(6) default NULL,
'service' varchar(50) default NULL,
'kind' varchar(50) default NULL,
'svcdate' varchar(50) default NULL,
'svctime' varchar(50) default NULL,
'notes' varchar(250) default NULL,
'dflag' int(4) default '0', PRIMARY KEY ('PlumbersiD')
) ENGINE=MyiSAM AUTO_INCREMENT=6 DEFAULT CHARSET=latin1
AUTO_INCREMENT=6;
```

Table structure for table 'Real Estate' CREATE TABLE 'Real_Estate'

```
('Real_EstateiD' int(6) unsigned NOT NULL auto_increment,
'CID' int(6) default NULL,
'type' varchar(50) default NULL,
'location' varchar(50) default NULL,
'area' varchar(50) default NULL,
'pricerange' varchar(50) default NULL,
'rooms' varchar(50) default NULL,
'cargarage' varchar(50) default NULL,
'pool' varchar(50) default NULL,
'firsttime' varchar(50) default NULL,
'financing' varchar(50) default NULL,
```

-continued
```
'notes' varchar(250) default NULL,
'dflag' int(4) default '0',
PRIMARY KEY ('Real_EstateiD')
) ENGINE=MyiSAM DEFAULT CHARSET=latin1 AUTO_INCREMENT=1;
```

Table structure for table 'addbuss'
CREATE TABLE 'addbuss'

```
('addbussiD' int(6) unsigned NOT NULL auto_increment,
'CID' int(6) default NULL,
'bname' varchar(255) default NULL,
'email' varchar(150) default NULL,
'cell' varchar(10) default NULL,
'phone' varchar(lO) default NULL,
'address' varchar(255) default NULL,
'country' varchar(50) default '0',
'state' varchar(50) default '0',
'city' varchar(50) default '0',
'street' varchar(50) default '0',
'zip' varchar(11) default '0',
'details' tinytext,
'keyword' tinytext,
'uri' varchar(255) default NULL,
'logtime' timestamp NOT NULL default CURRENT_TIMESTAMP on update CURRENT_TIMESTAMP,
'dflag' int(4) default '0',
'filter' varchar(4) NOT NULL default 'All',
'map' tinyint(4) NOT NULL default '1',
'chat' mediumtext,
'rating' tinyint(4) NOT NULL default '0',
'video' tinyint(4) NOT NULL default '0',
'image' tinyint(4) NOT NULL default '0',
'dollar' tinyint(4) NOT NULL default '0',
'review' tinyint(4) NOT NULL default '0',
PRIMARY KEY ('addbussiD'),
KEY 'CID' ('CID'),
KEY 'phone' ('phone'),
KEY 'country' ('country'),
KEY 'state' ('state'),
KEY 'city' ('city'),
KEY 'street' ('street'),
KEY 'zip' ('zip'),
KEY 'filter' (' filter'),
KEY 'bname' ('bname')
) ENGINE=MyiSAM AUTO_INCREMENT=921895 DEFAULT CHARSET=utf8 AUTO_INCREMENT=921895;
```

Example Forms

The brokering system—Form Creation Sheet

Category Name Aliases

Autos Vans, Cars, Sedans, Convertible, Coupe, Hybrid, Sport car, SUVs, Trucks

Seller Link: Dealers

Add Business: Add your Dealership

| Name | Type | List | Default | Example | Notes | DB TYPE/Form Element/Length |
|---|---|---|---|---|---|---|
| Make | Pull Down | 1. Acura ® 2. Alfa Romeo ® 3. Audi ® 4. BMW ® 5. Buick ® 6. Cadillac ®, etc. | | | | VARCHAR/SELECT/50 |
| Model | Open | | | (ex: E320, 328i) | | VARCHAR/TEXT/50 |
| New/Used | Pull Down | New/Used/Any | | | | VARCHAR/SELECT/50 |
| Year | Open | | | (ex: 2007-2009) | | VARCHAR/TEXT/50 |
| Color | Open | | | | | VARCHAR/TEXT/50 |
| Options | Open | | | (ex: Sports package) | | VARCHAR/TEXT/50 |
| Price | Open | | | (ex: $20-25k) | | VARCHAR/TEXT/50 |
| Financing | Pull Down | No/Yes/Lease | | | | VARCHAR/SELECT/50 |
| Warranty | Pull Down | Yes/No | | | | VARCHAR/SELECT/50 |
| Notes | Open | | | (ex: Must buy this week) | | VARCHAR/TEXTAREA/250 |

Category Name Aliases

Limos: Airport Limos, Party Limos

Seller Link: services

Add Business: Add your service

| Name | Type | List | Default | Example | Notes | DB TYPE/Form Element/Length |
|---|---|---|---|---|---|---|
| Type of service | Drop Down | Airport ride, Prom, Wedding Anniversary, Party, Other | | | | VARCHAR/SELECT/50 |

-continued

| Name | Type | List | Default | Example | Notes | DB TYPE/Form Element/Length |
|---|---|---|---|---|---|---|
| Vehicle Type | Drop Down | No Preference, Luxury Sedan, Stretch Limo, Luxury Party Bus, Hummer H2, Luxury SUV | | | | VARCHAR/SELECT/50 |
| Number of Passengers | Open | | | | | VARCHAR/TEXT/50 |
| Pick-up Location | Open | | | (ex: SFO Airport) | | VARCHAR/TEXT/50 |
| Drop-off Location | Open | | | (ex: Downtown) | | VARCHAR/TEXT/50 |
| Pick-up Date | Date | | | | | VARCHAR/DATE/50 |
| Pick-up Time | Open | | | (ex: 9:30 am) | | VARCHAR/TEXT/50 |
| Drop-off Date | Date | | | | | VARCHAR/DATE/50 |
| Drop-off Time | Open | | | | | VARCHAR/TEXT/50 |
| Price | Open | | | (ex: $50-$100) | | VARCHAR/TEXT/50 |
| Notes | Open | | | (ex: Want bar and mood lighting) | | VARCHAR/TEXTAREA/250 |

Category Name Aliases
Taxis: Cabs, City Cabs
Seller Link: services
Add Business: Add your service

| Name | Type | List | Default | Example | Notes | DB TYPE/Form Element/Length |
|---|---|---|---|---|---|---|
| Number of Passengers | Open | | | | | VARCHAR/TEXT/50 |
| Pick-up Location | Open | | | (ex: Downtown) | | VARCHAR/TEXT/50 |
| Drop-off Location | Open | | | (ex: Hollywood) | | VARCHAR/TEXT/50 |
| Pick-up Time | Open | | | (ex: 6:30 pm) | | VARCHAR/TEXT/50 |
| Notes | Open | | | (ex: No Vans) | | VARCHAR/TEXTAREA/250 |

Category Name Aliases
Flowers: Florists
Seller Link: Florists
Add Business: Add your Business

| Name | Type | List | Default | Example | Notes | DB TYPE/Form Element/Length |
|---|---|---|---|---|---|---|
| Occasion | Drop Down | Birthday, Anniversary, Love, Wedding, Get well, Sympathy, Thank you, New Baby, Just 'cause | | | | VARCHAR/SELECT/50 |
| Flowers Type | Drop Down | Roses Tulips Lilies Iris Orchids Mixed | | | | VARCHAR/SELECT/50 |
| Price Range | Open | | | (ex: $30-50) | | VARCHAR/TEXT/50 |
| Delivery Location | Open | | | (ex: Mission area) | | VARCHAR/TEXT/50 |
| Delivery Date | Calendar | | | | | VARCHAR/DATE/50 |
| Delivery Time | Open | | | (ex: 11 am) | | VARCHAR/TEXT/50 |
| Notes | Open | | | | | VARCHAR/TEXTAREA/250 |

Category Name Aliases
Real Estate: Homes, Condos, Townhomes
Seller Link: Realtors
Add Business: Add Your Company

| Name | Type | List | Default | Example | Notes | DB TYPE/Form Element/Length |
|---|---|---|---|---|---|---|
| Property Type | Drop Down | Single Family, Home, Duplex Townhome, Condominium | | | | VARCHAR/SELECT/50 |
| Location | Open | | | (ex: Mission, Lake side, Manhattan) | | VARCHAR/TEXT/50 |
| Area | Open | | | | | VARCHAR/TEXT/50 |
| Price Range | Open | | | | | VARCHAR/TEXT/50 |
| Rooms/ Bath | Open | | | (ex: 4 beds, 2 baths) | | VARCHAR/TEXT/50 |
| Car Garage | Drop down | Yes, No, Don't Care | | | | VARCHAR/SELECT/50 |
| Pool | Drop down | Yes, No, Don't Care | | | | VARCHAR/SELECT/50 |
| First Time buyer | Drop Down | Yes, No | | | | VARCHAR/SELECT/50 |
| Financing | Drop Down | Pre-Qualified, Need to Qualify, Don't Need | | | | VARCHAR/SELECT/50 |
| Notes | Open | | | (ex: Planning to buy this Summer) | | VARCHAR/TEXTAREA/250 |

Category Name Aliases    35
Movers: Moving
Seller Link: Movers
Add Business: Add Your service

| Name | Type | List | Default | Example | Notes | DB TYPE/Form Element/Length |
|---|---|---|---|---|---|---|
| Type of service | Drop Down | House, Move Furniture, Appliance, Piano, Big Screen TV, Office Move, Auto Move | | | | VARCHAR/SELECT/50 |
| Moving From | Open | | | (ex: Glendale) | | VARCHAR/TEXT/50 |
| Moving To | Open | | | (ex: Pasadena) | | VARCHAR/TEXT/50 |
| Storage Required | Pull Down | Yes, No | | | | OPTION |
| Moving Date | Calendar | | | | | VARCHAR/DATE/50 |
| Moving Time | Open | | | (ex: afternoon) | | VARCHAR/TEXTAREA/50 |
| Notes | Open | | | (ex: want an estimate) | | VARCHAR/TEXTAREA/250 |

Category Name Aliases
Doctors: Health, Physicians, Medical care
Seller Link: Doctors
Add Business: Add Your Practice

| Name | Type | List | Default | Example | Notes | DB TYPE/Form Element/Length |
|---|---|---|---|---|---|---|
| Specialty | Drop Down | Allergy, Cardiology, Dermatology, Family & General Practice, General Surgery, Gynecology, Internal Medicine, Neurology, Orthopedic | | | | VARCHAR/SELECT/50 |
| Insurance | Drop Down | Open | | (ex: Blue Cross, Medicare, etc.) | | VARCHAR/SELECT/50 |
| Appointment time | Open | | | (ex: afternoon preferred) | | VARCHAR/TEXT/50 |
| Notes | Open | | | (ex: Have severe headaches) | | VARCHAR/TEXTAREA/250 |

Category Name Aliases
Lawyers: Attorneys, Legal
Seller Link: Lawyers
Add Business: Add Your Firm

| Name | Type | List | Default | Example | Notes | DB TYPE/Form Element/Length |
|---|---|---|---|---|---|---|
| Area of Law | Drop Down | Arbitration & Mediation, Bankruptcy, Civil Rights, Civil service, Class Action Litigation, Criminal, Custody & Support, DUI & Traffic, Employee & Employer, Family, Immigration & Naturalization, Intellectual Property, Liable & Slander, Real Estate, Tort, Trial, Wills, Estates, Trusts & Probate | | | | VARCHAR/SELECT/50 |
| Case Summary | Open | | | (ex: want to file patents) | | VARCHAR/TEXTAREA/250 |
| Preferred appointment time | Open | | | (ex: After 5 pm) | | VARCHAR/TEXT/50 |
| Notes | Open | | | (ex: Already filed provisional patents.) | | VARCHAR/TEXTAREA/250 |

Category Name Aliases
Plumbers: Air Conditioning, Heating
Seller Link: Plumbers
Add Business: Add Your service

| Name | Type | List | Default | Example | Notes | DB TYPE/Form Element/Length |
|---|---|---|---|---|---|---|
| service Required | Drop Down | Drain Clearing, Water Heaters, Faucets and Sinks, Septic Systems, Sprinkler Systems, Pumps, General Maintenance | | | | VARCHAR/ SELECT/50 |
| Kind of service | Drop Down | Repair, Installation | | | | VARCHAR/TEXT/50 |
| Preferred service Date | Date | | | | | VARCHAR/DATE/50 |
| Preferred service Time | Open | | | (ex: before noon) | | VARCHAR/TEXT/50 |
| Notes | Open | | | (ex: I want a free estimate) | | VARCHAR/ TEXTAREA/250 |

Category Name Aliases
Home Loans: Mortgage, Real Estate loans, Refinancing, Home Equity        30
Seller Link: Lenders
Add Business: Add Your Company

| Name | Type | List | Default | Example | Notes | DB TYPE/Form Element/Length |
|---|---|---|---|---|---|---|
| Property Type | Drop Down | Single Family Home, Duplex, Town Home, Condo, Apartment, Vacation Home, Other | | | | VARCHAR/ SELECT/50 |
| Home Value | Open | | | | | VARCHAR/TEXT/50 |
| Loan Amount | Open | | | | | VARCHAR/TEXT/50 |
| Loan Type | Pull Down | Purchase, Refinancing, Home Equity | | | | VARCHAR/ SELECT/50 |
| Rate Type | Pull Down | Fixed 30 year, Fixed 15 year, Adjustable 3/30, Adjustable 5/30, Adjustable 7/30, Fully Adjustable | | | | VARCHAR/ SELECT/50 |
| Down Payment | Open | | | (ex: 10%) | | VARCHAR/TEXT/50 |
| Credit Rating | Drop Down | Excellent, Good, Fair, Bad | | | | VARCHAR/ SELECT/50 |
| Yearly Income | Open | | | (ex: 200k) | | VARCHAR/TEXT/50 |
| Monthly Payments | Open | | | (ex: $850) | | VARCHAR/TEXT/50 |
| Residence Type | Pull Down | Primary Home, Second Home, Vacation Home, Rental Property | | | | VARCHAR/ SELECT/50 |
| Current Mortgage | Open | | | (ex: first, $350,000, second, $50000) | | VARCHAR/TEXT/50 |

| Name | Type | List | Default | Example | Notes | DB TYPE/Form Element/Length |
|---|---|---|---|---|---|---|
| Current Rate | Open | | | (ex: 6.5% on first, 7% on second) | | VARCHAR/TEXT/50 |
| Notes | Open | | | (ex: No negative amortization) | | VARCHAR/TEXTAREA/250 |

Social Networking

Most times, the best way to find a local service or product is by hearsay. People ask their close friends and family for good stores or service providers. In the same context, service providers often would like to provide references to their new potential clients to establish credibility. The invention maps this need by electronic means over the web and through a Social Networking setup with unique methods.

Continuing with the present invention claim wherein there was a reference to map the matching of buyers and sellers in a Social Networking environment, the new concepts and claims include buyers liking or disliking a service provider through their own experiences and sharing that with other potential buyers. Sellers can invite their clients to become a reference for them. In Social Networks the identity of the reference provider is established within their circle of friends and family or acquaintances or community members, unlike existing open reviews where the identity may not be established for the reviewer. Clients can then add a review or rate the store or service provider and opt to become a reference. When new potential buyers/clients look at the list of references for that respective store or service provider, they can initiate a reference request including specific questions and get a confidential response (one-on-one) that is not public to get an opinion or shared experience. The confidentiality of the information makes the reference provider be more honest about their opinion and share their true experiences.

Figure 13:
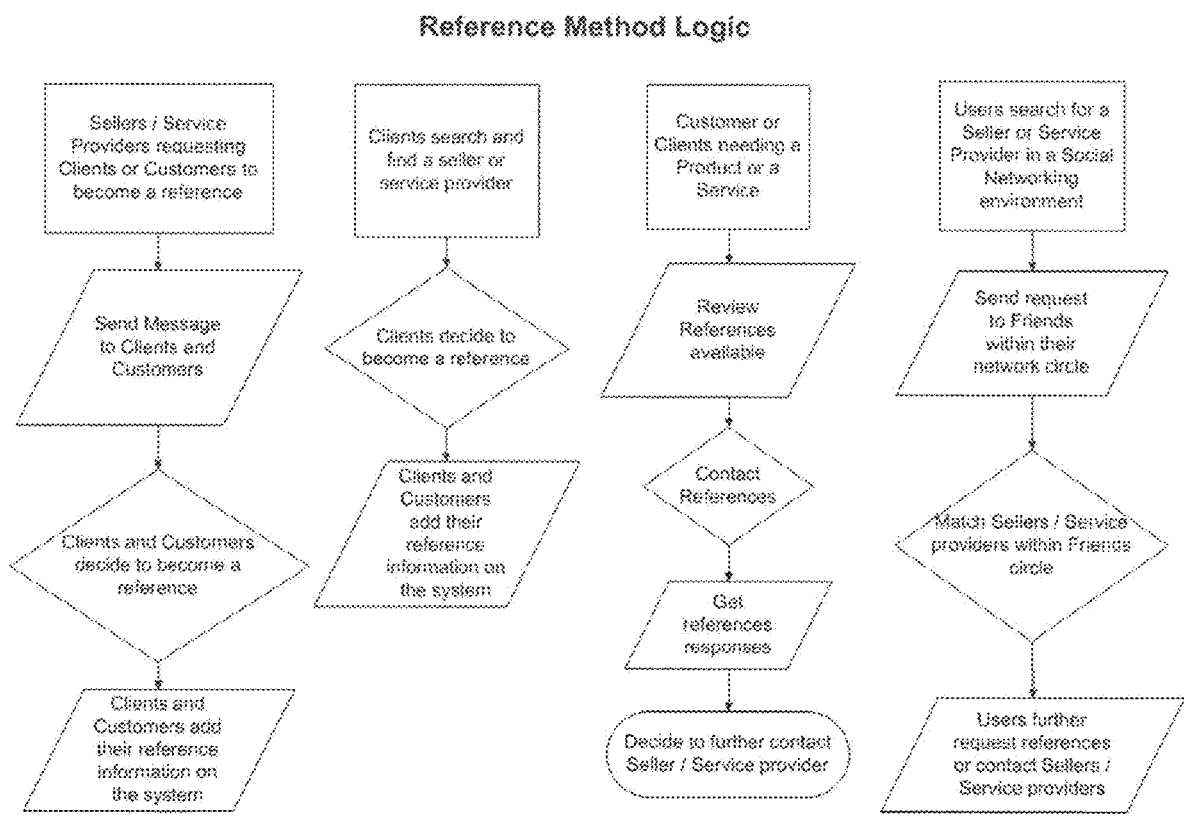
FIGS. 13 through 15 illustrate some of the logic and flow mechanisms as described for the invention.

Parts of this are illustrated in FIG. 13.

Mobile Local Search

Continuing with innovations and improvements to local search solutions, there is a compelling need for communicating the buyer or client information with minimum input but include more complete and accurate description from the user who may also be on the go. Search requirements come up as the user is in a certain location and away from a desktop computer. Present day users are equipped with mobile devices, smart phones and laptop computers. Most mobile devices include a digital camera with microphone to record and transmit audio and video messages over a network in addition to text.

Taking advantage of the proliferation of these high tech devices, the invention comprises easy user input with minimal typed input and automatic information used to match the closest and best options for stores/service provider local search.

The invention is also an improvement of service as a user is not mobile but can easily capture audio/video messages without having to type and better communicate the need for a product or service.

Example

1. A leaking faucet. The user takes a picture or records a video of the problem and sends it to the system, which then matches multiple plumbers who may be able to provide a quick and cost effective service.
2. The user records a video of possible options for a home he/she is looking for and transmits it to the system.
3. The user takes a picture of a custom cabinet that he wants built with annotated voice messages.

It is the reverse of what is mostly offered on the internet today, methods of marketing a product or a service and enticing a potential buyer vs. the buyer is seeking a product or a service and communicates that over the internet to the system to match with the best options available. The benefits of utilizing audio and video inputs in addition to text include, better description of the need resulting in a more accurate match, quicker turnaround to get an estimate of costs to get a quote estimate, avoid wasted trips and improved efficiency.

Customer Relationship Management (CRM)

In the original application, references were made to deliver the leads to external Customer Relationship Management (CRM) systems. In the new claims, an integrated CRM system is described. The local search lead contacts acquired by the seller or service providers needs to be further contacted with information towards converting the prospect to a real customer/client. Some examples of what can be sent and saved in the CRM system are (i) specific status information; (ii) action to be performed can be maintained in the system; (iii) price quotations can be generated, sent and saved in the system; (iv) search can be made to find specific or a range of prospects with parameters; (v) notes can be added on the system as seller or service providers discuss with their prospects or clients; and messages can be sent and saved on the system with trails of the staff who made the contact and the content with time/date stamps.

Figure 15:
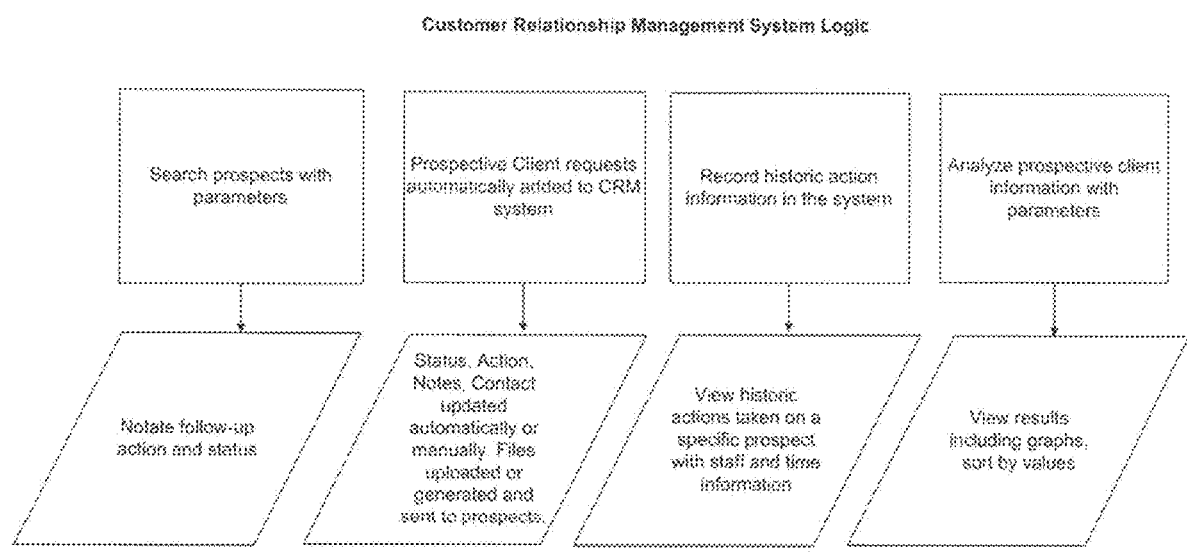

Seller or service providers benefit from a streamlined work flow with an integrated CRM system in the process of customer acquisition and continued service. Further analytics on the advertising channels, search parameters including keywords phrases, and date/time help improve efficiency. FIG. 15 illustrates aspects of this.

Example

1. Action Definitions: call prospect, do follow-up, send quote, service start, process payment, completed.
2. Status Definitions: first call made, expressed interest, likely to close, unlikely to close, follow up needed, just shopping, needs quote, quoted, paid, service start, service in progress, service completed, canceled, refunded, closed.

Possible Hardware

Figure 16:
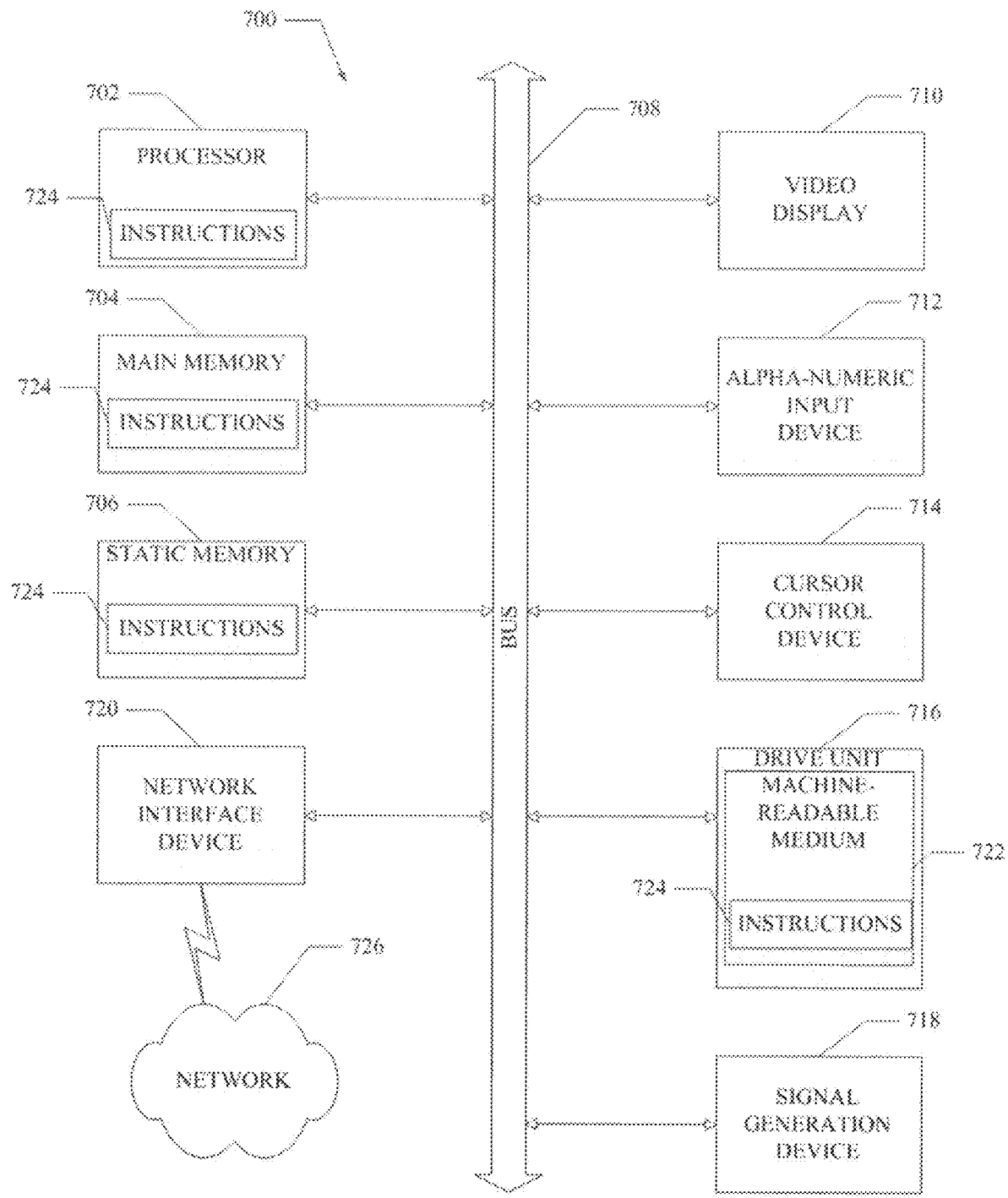
FIG. 16 shows a diagrammatic representation of machine in the example form of a computer system within which a set of instructions when executed may cause the machine to perform any one or more of the methodologies discussed herein.

FIG. 16 shows a diagrammatic representation of a machine in the example form of a computer system 700 within which a set of instructions when executed may cause the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" can also be taken to include any medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention.

Thus, while the invention has been described with respect to exemplary embodiments, one skilled in the art will recognize that numerous modifications are possible. For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. An electronic transaction processing system that receives buyer content from a buyer computer system and provides that buyer content to vendor computer systems, thereby facilitating vendor-buyer negotiations for providing the buyer with a needed product or service, the electronic transaction processing system comprising:
   non-transitory memory storage for tracking buyer contact information and buyer requests sent to vendors, wherein the buyer requests are requests sent in response to buyer input of the buyer content and a buyer selection of one or more vendors from available vendors monitored by the electronic transaction processing system; and
   non-transitory memory storage for multimedia content associated with the buyer requests, wherein the multimedia content includes arbitrary buyer-generated content specific to the buyer requests to be sent to the buyer selection of the one or more vendors, wherein the arbitrary buyer-generated content is independent of selections provided by the electronic transaction system and relates to the buyer request and a product or service being requested by a buyer.

2. The electronic transaction processing system of claim 1, wherein the multimedia content associated with the buyer requests comprises one or more of a buyer's textual description of the buyer's need, a short text message describing the buyer's need, an image generated by the buyer illustrative of the buyer's need, a photograph, an audio recording, and/or a video recording related to the buyer's need.

3. The electronic transaction processing system of claim 1, wherein the buyer computer system is a network-connected mobile device, a laptop computer, a smartphone, or a handheld device.

4. The electronic transaction processing system of claim 1, further comprising:
   computer elements that can automatically determine the relative geographic location of the buyer computer system at the time a buyer request is being made;
   logic to provide that relative geographic location to the electronic transaction processing system; and
   logic for filtering vendors that are provided the buyer request based on a relative location of vendor points of sales/service relative to the relative geographic location of the buyer computer system at the time a buyer request is being made.

5. The electronic transaction processing system of claim 4, wherein the computer elements that can automatically determine the relative geographic location of the buyer computer system comprises one or more of an IP address mapper, a GPS processor, or a cellular tower triangulation system.

6. The electronic transaction processing system of claim 1, further comprising memory storage for multimedia content associated with the vendor responses to buyer requests.

7. The electronic transaction processing system of claim 1, further comprising logic for receiving rate quotes from one or more vendor and logic for confirming acceptance to purchase a product or render a service.

8. The electronic transaction processing system of claim 1, further comprising logic for handling payment for a product delivered or service rendered.

9. The electronic transaction processing system of claim 1, wherein multiple quote responses including optional details for a requested product/service can be viewed.

10. The electronic transaction processing system of claim 1, wherein multimedia content associated with a vendor response comprises one or more of a textual description of the vendor's response, a short text message, an image illustrative of the vendor's response, a photograph, an audio recording, and/or a video recording related to the vendor's product or service details, offering in response to a buyer's request.

11. The electronic transaction processing system of claim 1, wherein buyer requests are sent to vendors without complete contact information of the buyers.

12. The electronic transaction processing system of claim 11, further comprising providing vendors with additional contact information of buyers when a buyer contact disclosure criteria is met.

13. The electronic transaction processing system of claim 1, wherein vendor responses are sent to buyers without fully specifying the vendor.

14. The electronic transaction processing system of claim 13, further comprising providing buyers with additional contact information of vendors when a vendor contact disclosure criteria is met.

* * * * *